United States Patent
Rathod et al.

(10) Patent No.: US 12,517,804 B2
(45) Date of Patent: Jan. 6, 2026

(54) GENERATING TECHNOLOGY ENVIRONMENTS FOR A SOFTWARE APPLICATION

(71) Applicant: Bank of America Corporation, Charlotte, NC (US)

(72) Inventors: Chirag Himatlal Rathod, Mumbai (IN); Kalpesh Fatehchand Jain, Thane (IN); Ramesh Lakshmi Narayanan, Chennai (IN); Satish Kumar Kommineni, Hyderabad (IN); Venkata Apparao Alla, Hyderabad (IN); Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 1102 days.

(21) Appl. No.: 17/378,118

(22) Filed: Jul. 16, 2021

(65) Prior Publication Data

US 2023/0018145 A1    Jan. 19, 2023

(51) Int. Cl.
*G06F 11/34* (2006.01)
*G06F 9/455* (2018.01)

(52) U.S. Cl.
CPC .......... *G06F 11/3495* (2013.01); *G06F 9/455* (2013.01)

(58) Field of Classification Search
CPC .. G06F 11/3495; G06F 9/455; G06F 11/3428; G06F 11/3447; G06F 11/3457; G06F 9/445
See application file for complete search history.

(56) References Cited

U.S. PATENT DOCUMENTS

| | | | |
|---|---|---|---|
| 7,788,375 B2 | 8/2010 | Fellenstein et al. |
| 7,992,033 B2 | 8/2011 | Childress et al. |
| 8,255,529 B2 | 8/2012 | Ferris et al. |
| 8,381,219 B2 | 2/2013 | Boris |
| 8,402,139 B2 | 3/2013 | Ferris et al. |
| 8,424,059 B2 | 4/2013 | Kwok et al. |

(Continued)

OTHER PUBLICATIONS

Patil et al. "VirtPerf: A Performance Profiling Tool for Virtualized Environments" 2011 IEEE 4th International Conference on Cloud Computing; DOI 10.1109/CLOUD.2011.67 [retrieved on Jul. 27, 2027] (Year: 2011).*

(Continued)

*Primary Examiner* — Emerson C Puente
*Assistant Examiner* — Alfred H B Wechselberger

(57) ABSTRACT

A system is configured to obtain information relating to a current application environment of a software application including information relating to technology components and technology products being used in the current application environment. The system builds one or more model application environments for the software application. The system receives a request for a level of performance associated with a technology component and selects a technology product for the technology component that satisfies the requested level of performance, based on a performance benchmark of the technology product. The system builds one of the model application environments using the selected technology product for the technology component that satisfies the requested level of performance.

17 Claims, 6 Drawing Sheets

(56) References Cited

U.S. PATENT DOCUMENTS

| | | |
|---|---|---|
| 8,489,465 B2 | 7/2013 | Chang et al. |
| 8,544,015 B2 | 9/2013 | Attanasio et al. |
| 8,726,243 B2 | 5/2014 | Nasuto et al. |
| 8,738,333 B1 | 5/2014 | Behera et al. |
| 8,793,377 B2 | 7/2014 | Anderson, III et al. |
| 8,909,769 B2 | 12/2014 | Radhakrishnan |
| 8,966,473 B2 | 2/2015 | Fellenstein et al. |
| 9,020,794 B2 | 4/2015 | Chen et al. |
| 9,047,410 B2 | 6/2015 | Markande et al. |
| 9,275,172 B2 | 3/2016 | Ostermeyer et al. |
| 9,317,337 B2 | 4/2016 | Anderson et al. |
| 9,454,469 B2 | 9/2016 | Dimitrovich et al. |
| 9,465,644 B2 | 10/2016 | Anderson et al. |
| 9,471,380 B2 | 10/2016 | Fellenstein et al. |
| 9,641,392 B2 | 5/2017 | Anderson et al. |
| 9,811,445 B2 | 11/2017 | Moretto et al. |
| 10,097,438 B2 | 10/2018 | Ferris et al. |
| 10,200,252 B1 | 2/2019 | Qin et al. |
| 10,230,601 B1 | 3/2019 | Qin et al. |
| 10,261,819 B2 | 4/2019 | Bhogal et al. |
| 10,389,651 B2 | 8/2019 | Ferris et al. |
| 10,394,612 B2 | 8/2019 | Grigoryan et al. |
| 10,467,128 B2 | 11/2019 | Conti et al. |
| 10,684,939 B2 | 6/2020 | Conti et al. |
| 10,754,704 B2 | 8/2020 | Rao et al. |
| 10,757,035 B2 | 8/2020 | Ferris et al. |
| 10,776,730 B2 | 9/2020 | Abuelsaad et al. |
| 10,924,506 B2 | 2/2021 | Ferris et al. |
| 11,003,431 B2 | 5/2021 | Bhatnagar et al. |
| 2005/0234937 A1 | 10/2005 | Ernest et al. |
| 2009/0300423 A1 | 12/2009 | Ferris |
| 2015/0220420 A1* | 8/2015 | Boneti ............... G06F 11/3419 714/37 |
| 2016/0210213 A1* | 7/2016 | Eckmann ........... G06F 11/3457 |
| 2016/0283304 A1 | 9/2016 | Horikawa et al. |
| 2016/0283362 A1* | 9/2016 | Seto .................. G06F 16/2455 |
| 2019/0286470 A1 | 9/2019 | Cao et al. |
| 2020/0026565 A1 | 1/2020 | Rajendran et al. |
| 2020/0053175 A1* | 2/2020 | Bodman ................ H04L 67/01 |
| 2020/0311573 A1 | 10/2020 | Desai et al. |
| 2022/0237107 A1* | 7/2022 | Subbunarayanan ....................... G06F 9/45504 |
| 2022/0413992 A1* | 12/2022 | Nguyen ............. G06F 11/3428 |
| 2023/0318911 A1* | 10/2023 | Hendrey ............ H04L 41/5054 709/220 |

OTHER PUBLICATIONS

Rathod, C. et al., "Improving Technology Environment for a Software Application," U.S. Appl. No. 17/378,024, filed Jul. 16, 2021, 76 pages.

Rathod, C. et al., "Analyzing Performance Metrics for Improving Technology Environment of a Software Application," U.S. Appl. No. 17/378,228, filed Jul. 16, 2021, 76 pages.

Rathod, C. et al., "Determining an Improved Technology Environment for a Software Application," U.S. Appl. No. 17/378,299, filed Jul. 16, 2021, 76 pages.

* cited by examiner

GENERATING TECHNOLOGY ENVIRONMENTS FOR A SOFTWARE APPLICATION

TECHNICAL FIELD

The present disclosure relates generally to managing performance of software implemented systems, and more specifically to generating technology environments for a software application.

BACKGROUND

A number of technology products are presently available to implement and run a software application. Currently an application environment for a software application is designed based on one or more desired performance criteria for the application. The application environment is built using a set of technology products that satisfy the performance criteria of the application. The application is expected to behave in a desired manner when deployed in the application environment using the set technology products. However, a technology product may not perform in a desired manner when deployed in the application environment in relation to one or more performance parameters including application performance, deployment strategy, availability issues and other application performance parameters. Thus, there is no way of knowing whether the application will behave in a desired manner when actually deployed in the application environment. For example, an application may be designed for use with a particular type of server expecting 50 to 100 users at any one time. However, when the application is actually deployed, the volume of user traffic may go beyond the expected traffic which the particular server may be incapable of handling. In this case, the application environment may need to be redesigned to suit the changed application requirements. Further, the technology landscape is continuously changing with new and emerging technology products being added regularly and enhancements being added to the current set of technology products.

SUMMARY

The system and method implemented by the system as disclosed in the present disclosure provide technical solutions to the technical problems discussed above by recommending one or more application environments and/or specific technology products suitable to run a software application. The disclosed system and methods provide several practical applications and technical advantages. For example, the disclosed system provides the practical application of recommending an application environment and/or a technology product that is better suited to the software application as compared to a current application environment of the software application. As disclosed in accordance with embodiments of the present disclosure, an application manager tests different combinations of technology products for the technology components required to run the software application and recommends an alternative combination of technology products for the technology components that is different from the combination of technology products currently used in the current application environment and can yield better performance of the software application corresponding to one or more performance metrics. As disclosed in the following disclosure, the application manager obtains information relating to the technology components of the current application environment and specific technology products used for those technology components in the current application environment. The application manager may additionally obtain information relating to one or more performance requirements of the software application including load performance and processing performance required for the software application. Based on the obtained information, application manager builds a plurality of alternative model application environments that can potentially be used for the software application such that each model application environment includes a different combination of technology products for the technology components needed to run the software application. Application manager runs the software application in each of the model application environments in a simulated environment and collects data relating to a plurality of performance metrics related to performance of the software application in each of the model application environments. Application manager analyzes the performance metrics collected for each model application environment (including the current application environment) and generates a recommendation report based on the analysis. The recommendation report may include a recommendation to use one or more model application environments for the software application that are found to perform better than the current application environment based on the analysis of the performance metrics. Additionally or alternatively, the recommendation report may include recommendations to use individual technology products for one or more technology components that satisfy one or more performance requirements of the software application.

The disclosed system and methods provide an additional practical application of adjusting the current application environment of the software application from time to time to accommodate changing performance requirements of the software application. As described in accordance with certain embodiments of the present disclosure, the application manager may collect information relating to one or more performance requirements of the software application according to a pre-determined schedule (e.g., periodically). Based on the collected information, application manager may determine whether one or more performance requirements of the software application has changed over time and builds a customized application environment for the software application based on the current performance requirements of the software application. This may ensure that the current application environment of the software application evolves to accommodate the changing performance requirements of the software application.

The disclosed system and methods provide an additional practical application of evolving the current application environment of the software application to accommodate new and emerging technologies. For example, when a new technology product is added for a technology component being using in the current technology environment, the application manager may be configured to assess whether the newly added technology product can be used in an application environment for the software application. For example, when the newly added technology product corresponds to a technology component being used by the current technology environment of the software application, application manager may determine that the newly added technology product may be used in the application environment of the software application. Additionally or alternatively, application manager may determine whether the newly added technology product improves performance of the software application corresponding to at least one performance metric (e.g., load performance, processing performance etc.). Application manager may be configured to build a new model application environment by selecting the newly added technology product for the respective technology component in response to determining that the newly added technology product can be used in the application environment of the software application and/or that the newly added technology product improves performance of the software application corresponding to at least one performance metric.

The disclosed system and methods provide an additional practical application of improving performance (e.g., processing performance) of a computing system running the software application by recommending usage of a technology environment and/or technology product that improves the performance of the computing system while running the software application. As disclosed in accordance with certain embodiments of the present disclosure, application manager may maintain information relating to performance benchmarks for each technology product under distinct performance conditions such as user traffic and amount of data being handled by the software application. A performance benchmark relating to a technology product includes a level of performance provided by the technology product corresponding to at least one performance metric. A performance metric, as discussed below, may relate to a load performance and/or processing speed performance of the technology product. For example, a technology product may be associated with high load performance meaning the technology product can handle a large amount of user traffic and/or large amount of data. Another technology product may be associated with high server performance which may mean that the technology product provides fast server response times. Application manager may build custom application environments for the software application by selecting one or more technology products based on their corresponding performance benchmarks, to improve processing performance of the computing system running the software application. For example, application manager may include a technology product in the application environment that improves the response time of the computing system. running the software. Similarly, application manager may include a technology product in the application environment that can handle a higher load (e.g., user traffic, data load etc.) to avoid the application server from freezing and/or crashing, thus improving the performance of the application server.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
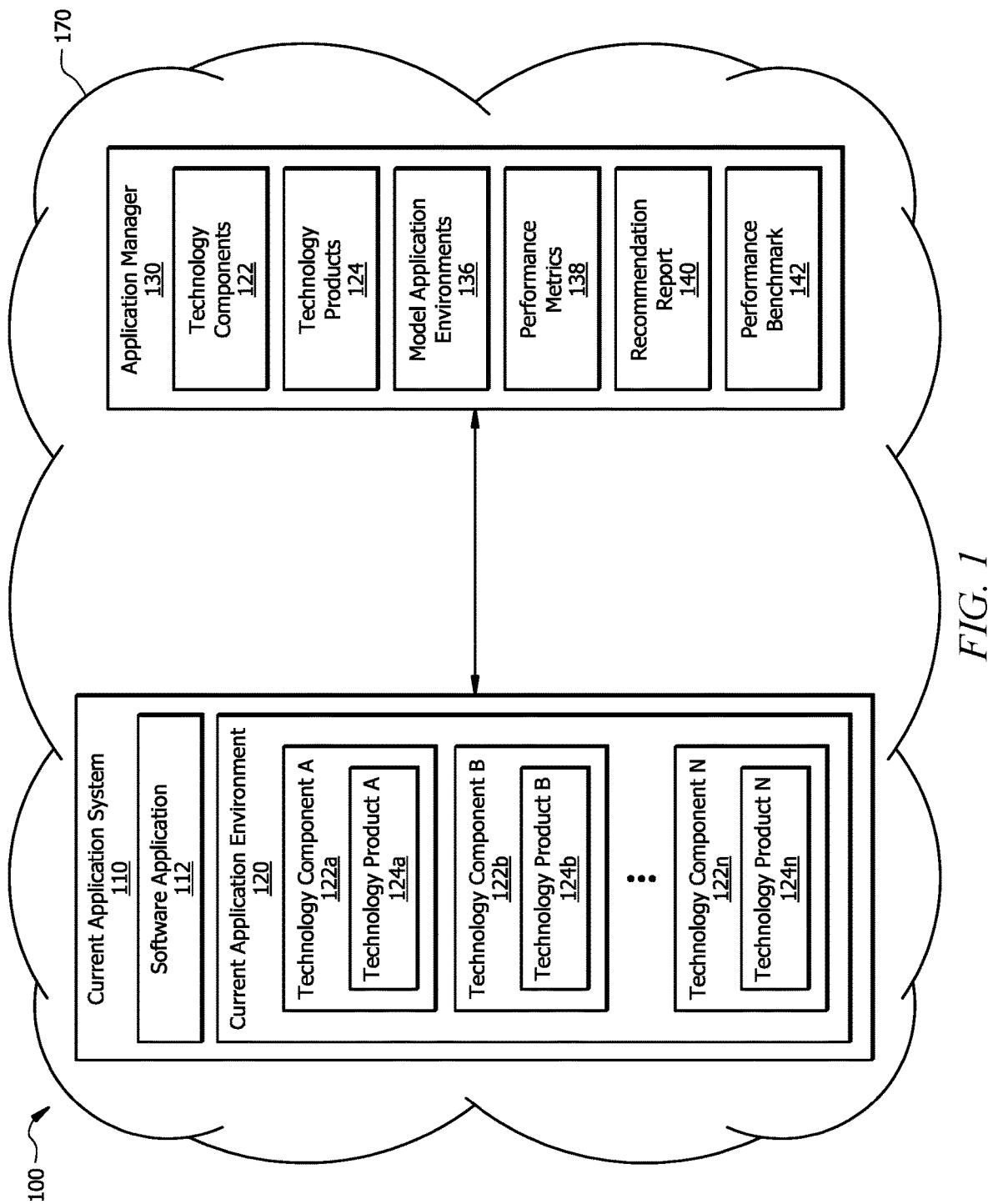
FIG. 1 is a schematic diagram of an example data processing system, in accordance with certain embodiments of the present disclosure.

FIG. 1 is a schematic diagram of an example data processing system 100, in accordance with certain embodiments of the present disclosure.

As shown in FIG. 1, data processing system 100 includes a current application system 110 and an application manager 130, each connected to a network 170. The network 170, in general, may be a wide area network (WAN), a personal area network (PAN), a cellular network, or any other technology that allows devices to communicate electronically with other devices. In one or more embodiments, the network 170 may be the Internet.

The current application system 110 may run a software application 112 in a current application environment 120. The current application environment 120 may use technology components (shown as 122a-122n), wherein each technology component 122a-122n uses a respective technology product (shown as 124a-124n). In one example use case, current application system 110 may be representative of a production server of an organization that runs the software application 112 in the current application environment 120. The production server may be configured to be accessed by several users desiring to use the functionality implemented by the software application 112. Each technology component 122a-122n may refer to a type of hardware or software tool used to implement, run and/or support the software application 112. For example, a technology component may include, but is not limited to, a middleware component, an operating system component, a database engine component, an implementation technology component (e.g., coding language used to implement the software application 112), a cloud provider component, a network technology component (e.g., WAN, LAN, VPN etc.), a virtualization technique component and a server less computing technology component. A technology product 124a-124n may refer to a specific hardware or software tool/technology used for a corresponding technology component. For example, Apache Tomcat® can be a technology product used as a middleware component. Thus, the term "technology component" may generally refer to a type of technology product, and the term "technology product" may refer to a specific hardware or software tool used for a respective technology component. In one example case, current application environment 120 may include three technology components 122a, 122b and 122c using respective technology products 124a, 124b and 124c. Technology component 122a may be a middleware component that uses Apache Tomcat server as the specific technology product 124a. Technology component 122b may be a database engine component that uses SQL server as the specific technology product 124b. Technology component 122c may be a virtualization technique component that uses VMware virtual machine as the specific technology product 124c.

Several alternative technology products 124 are typically available corresponding to each technology component 122a-122n. For example, technology product alternatives for the operating system (OS) component may include, but are not limited to, Windows OS, Linux OS, Redhat OS and Fedora OS. Technology product alternatives for the implementation technology component may include, but are not limited to, C++, Java, C #, Python and JavaScript. Technology product alternatives for the middleware technology component may include, but are not limited to, Apache Tomcat server, JBoss server and Oracle server. Technology product alternatives for the cloud component may include, but are not limited to, Microsoft Azure, Amazon webservices and Google cloud platform. Technology product alternatives for the network component may include, but are not limited to, Local Area Network (LAN), Wireless (WLAN), Wide Area Network (WAN) and Virtual Private Network (VPN). Technology product alternatives for the virtualization technique component may include, but are not limited to, VMware, Microsoft Hyper-V, Openstack and Xen.

As described above, the technology products 124a-124n used for the respective technology components 122a-122n in the current application environment 120 may not be the most optimal for the software application 112. That is, the current application environment 120 may not always yield the performance desired for the software application 112.

Application manager 130 is configured to test different combinations of technology products 124 for the technology components 122a-122n required to run the software application 112 and recommend an alternative combination of technology products 124 for the technology components 122a-122n that is different from the combination of technology products 124a-124n currently used in the current application environment 120 and can yield better performance of the software application 112 corresponding to one or more performance metrics.

Application manager 130 may be configured to store information relating to a plurality of alternative technology products 124 that can be used for each of a plurality of technology components 122. Application manager 130 may be configured to build a plurality of model application environments 136 such that each of the model application environments 136 includes a different combination of the technology products 124 used for the technology components 122. Application manager 130 may be configured to obtain information relating to the current application environment 120 being used for the software application 112. In one embodiment, application manager 130 may use an application connector to obtain the information relating to the current application environment 120. The application connector may be a software agent designed to run on the current application system 110 and extract information relating to the current application environment 120 from the current application system 110. The information extracted by the application connector may include information relating to the particular technology components 122a-122n of the current application environment 120 and the specific technology products 124a-124n being used for each technology component 122a-122n. In one embodiment, the information extracted by the application connecter may include information relating to one or more performance requirements of the software application with regard to one or more performance metrics including load performance and processing performance. As described below, the information relating to the performance requirements of the software application may be used by application manager 130 to recommend one or more model application environments 136 and/or technology products that suit the performance requirements.

Based on the information obtained from the current application system 110, application manager 130 may be configured to build a plurality of alternative model application environments 136 that can potentially be used for the software application 112. For example, based on the information obtained from the current application system 110, application manager 130 may determine the technology components 122a-122n that need to be incorporated into an application environment meant for the software application 112. Once, the technology components 122a-122n are identified, application manager 130 may identify the plurality of alternative technology products 124 available for each of the technology components 122a-122n. The alternative technology products 124 identified for each technology component 122a-122n may include the current technology product 124a-124n being used in the current application environment 120 for the technology components 122a-122n. Application manager 130 may be configured to build a plurality of model application environments 136 for the software application 112 by selecting for each model application environment 136 a different combination of the technology products 124 for the technology components 122a-122n. That is, each model application environment 136 is built to use a combination of technology products 124 that is different from the combinations of technology products 124 used for other model application environments 136 built for the software application 112. In one embodiment, application manager 130 also builds a copy of the current application environment 120 for comparing with other model application environments 136.

For example, when the technology components 122a-122n of the current application environment 120 includes a middleware component, a database engine component and a virtualization technique component, application manager 130 may identify alternative technology products for each of a middleware component, a database engine component and a virtualization technique component. Application manager 130 may build a plurality of potential model application environments 136 for the software application 112 by using different combinations of technology products 124 for the middleware component, database engine component and virtualization technique component. For example, application manager 130 may build each model application environment by selecting a different alternative technology product 124 for at least one of the technology components 122a-122n.

Application manager 130 may be configured to automatically configure each of the model application environments 136 to suit the software application 112. The application manager 130 may be configured to obtain information relating to how the software application 112 is configured with respect to one or more parameters (e.g., logging-in, load balancing, database details etc.) in the current application environment 120. Application manager 130 may configure each of the model application environments 136 for the software application 112, based on the configurations in the current application environment 120, for example, to match the configurations in the current application environment 120. Application manager 130 may also configure one or more parameters of a model application environment by modifying the configuration of the parameters in the current application environment 120 to suit the model application environment 136.

Application manager 130 may maintain information relating to performance benchmarks 142 for each technology product 124 under distinct performance conditions such as user traffic and amount of data being handled. A performance benchmark 142 relating to a technology product 124 includes a level of performance provided by the technology product 124 corresponding to at least one performance metric 138. A performance metric 138, as discussed below, may relate to a load performance and/or processing speed performance of the technology product 124. For example, a technology product 124 may be associated with high load performance meaning the technology product 124 can handle a large amount of user traffic and/or large amount of data. Another technology product 124 may be associated with high server performance which may mean that the technology product 124 provides fast server response times. The performance benchmarks 142 of the technology products 124 may allow the application manager 130 to build custom model application environments by selecting one or more technology products 124 that satisfy specific performance requirements of the software application 112. For example, application manager 130 may be configured to obtain information relating to at least one performance requirement of the software application 112 corresponding to a technology component 122. Application manager 130 may be configured to determine a technology product 124 available for the technology component 122 and that satisfies the performance requirement, based on the performance benchmark 142 stored for the technology product 124. Application manager 130 may be configured to build a model application environment 136 for the software application 112 by selecting the technology product 124 for the technology component 122.

Application manager 130 may be configured to evolve to accommodate new and emerging technologies. For example, when a new technology product 124 is added for a technology component 122, application manager 130 may be configured to assess whether the newly added technology product 124 can be used in an application environment for the software application 112. For example, when the newly added technology product 124 corresponds to a technology component 122a-122n being used by the current technology environment 120 of the software application 112, application manager 130 may determine that the newly added technology product 124 may be used in the application environment of the software application 112. Additionally or alternatively, application manager 130 may be configured to determine whether the newly added technology product 124 satisfies one or more performance requirements of the software application 112. Application manager 130 may be configured to build a new model application environment 136 by selecting the newly added technology product 124 for the respective technology component 122. Application manager 130 may build the new model application environment 136 in response to determining that the newly added technology product 124 can be used in the application environment of the software application 112 and/or that the newly added technology product 124 satisfies at least one requirements of the software application 112. In one embodiment, application manager 130 may be configured to collect information relating to one or more performance requirements of the software application 112 according to a pre-determined schedule (e.g., periodically). Application manager 130 may be configured to detect whether the performance requirements of the software application 112 has changed and build a customized application environment for the software application 112 based on current performance requirements of the software application 112. This may ensure that the current application environment 120 of the software application 112 evolves to accommodate the changing performance requirements of the software application 112.

Application manager 130 may be configured to run the software application 112 in each of the model application environments 136 in a simulated environment. One of the model application environments 136 may be a copy of the current application environment 120. Application manager 130 may include a simulator logic that can be configured to host and deploy each of the model application environments 136 (including the current application environment 120) and run the software application 112 in each of the model application environments 136. Application manager 130 may be configured to collect data relating to a plurality of performance metrics 138 related to performance of the software application in each of the model application environments 136 while running in the simulated environment. The plurality of performance metrics 138 may include, but are not limited to, one or more of application server performance, performance related to type of data handled by the software application, database performance, data security analysis, input and output analysis and deployment on cloud platforms. Application server performance may relate to response time of the application server at different levels of load (e.g., user traffic, amount of data etc.). Performance data related to the type of data handled by the software application 112 may include information relating to whether the software application 112 handles sensitive data needing a higher level of security and whether a model application environment 136 can handle sensitive data. This performance metric may allow the application manager 130 to recommend secure technology products 124 that can securely handle sensitive user data, such as private cloud product or a virtual machine where the virtualization is done at the hardware level to provide maximum security. Database performance may relate to database response times. Data relating to data security analysis may include security vulnerabilities (e.g., relating to data security) of the software application 112 in particular model application environments 136. Application manager 130 scans the software application 112 for known vulnerabilities in each model application environment 136 and for potential threats to the application 112. Application manager 130 may determine based on this performance metric whether a particular model application environment 136 is vulnerable to attacks. Data related to deployment on cloud platforms may include information relating to whether the software application 112 can be deployed on cloud platforms. For example, application manager 130 may be configured to analyze whether the software application 112 is suitable for deploying on a cloud platform based on running the software application 112 in model application environments 136 including cloud deployments. This performance metric may help the application manager 130 determine whether the software application 112 can be deployed on cloud platforms or is more suitable for a private in-house server or virtual machine deployment.

To measure the performance of the software application 112 in each model application environment 136, application manager 130 may be configured to run one or more tests on each model application environment 136 while the simulator logic is running the software application 112 in the model application environment 136. Application manager 130 may collect one or more of the performance metrics 138 described above corresponding to each model application environment 136 as a result of conducting the one or more tests. The tests may include load testing to test the software application 112 at different amounts of load (e.g., user traffic, amount of data etc.). For example, load testing may include simulating simultaneous logins of different numbers of users using different amounts of test data. Additionally or alternatively, the tests may include performance testing to test the overall performance of a model application environment 136 and collect data on performance metrics 138 including availability, response time and stability of the software application 112. In one example, for each model application environment 136, application manager 130 carries out the testing in multiple cycles with different amounts of load. For example, each model application environment 136 is tested initially with 10 k simultaneous user logins and 100 GB of test data. This test cycle is then repeated three times with a replication load factor of 2λ. This means with each test cycle, the load applied is two times that applied in the previous test cycle. In one embodiment, the load size may be customized based on the requirements of the software application 112. In an additional embodiment, application manager 130 tests each model application environment 136 for security vulnerabilities (e.g., data security) and collects data relating to how vulnerable the model application environment 136 is to potential security threats.

Application manager 130 may be configured to analyze the performance metrics 138 collected for each model application environment 136 (including the current application environment 120) and generate a recommendation report 140 based on the analysis. The recommendation report 140 may include a recommendation to use one or more model application environments 136 for the software application 112 that are found to perform better than the current application environment 120 based on the analysis of the performance metrics 138. Additionally or alternatively, the recommendation report 140 may include recommendations to use individual technology products 124 for one or more technology components 122 that satisfy one or more performance requirements of the software application 112.

In order to analyze the performance metrics 138, application manager 130 may be configured to segregate the performance metrics 138 collected for each model application environment 136 including the current application environment 120. The segregating may include grouping together data collected for each performance metric 138 for all the model application environments 136. For example, data relating to application server performance metric collected for all model application environments 136 may be grouped together. Similarly, data relating to database performance metric collected for all model application environments 136 may be grouped together. Application manager 130 may compare the model application environments 136 based on each performance metric 138 collected for the respective model application environments 136. For example, the application server performance metric of all model application environments 136 may be compared separately. Similarly, the database performance metric of all model application environments 136 may be compared separately. Application manager 130 may recommend one or more model application environments 136 and/or individual technology products 124 based on results of the comparison. In one or more embodiments, for each model application environment 136 (including the current application environment 120), application manager 130 assigns a performance score to each performance metric 138 collected for the model application environment 136. Application manager 130 may be configured to assign a higher score for a higher level of performance related to a performance metric 138. For example, if a first model application environment 136 is found to be able to handle 500 simultaneous user logins at one time and a second model application environment 136 is found to be able to handle 10k simultaneous user logins at one time, the application performance metric for the second model application environment 136 is assigned a higher performance score than the application performance metric for the first model application environment 136. Application manager 130 may be configured to compare the respective scores of each performance metric 138 collected for several model application environments 136. Application manager 130 may be configured to recommend a model application environment 136 that is found to have a higher score with regard to one or more performance metrics 138 as compared to the respective scores of the one or more performance metrics 138 collected for other model application environments 136. Following the above example, application manager 130 may recommend the second model application environment 136 for the software application 112 over the first model application environment 136 based on the higher score associated with the application server performance metric collected for the second model application environment 136.

In one or more embodiments, application manager 130 may be configured to compare the total performance scores of multiple performance metrics 138 collected for each model application environment 136 and recommend a model application environment 136 that has the highest total performance score for the performance metrics 138. For example, application manager 130 may compare the total performance scores of all performance metrics 138 collected for each model application environment 136 and recommend a model application environment 136 that has the highest total performance score of for the performance metrics 138.

In one or more embodiments, application manager 130 may be configured to sort the performance metrics 138 collected for each model application environment 136 (including the current application environment 120) based on one or more requirements of the software application 112, for example, by placing a higher priority on performance metrics 138 that are associated with the one or more requirements of the software application 112. Application manager 130 may be configured to recommend one or more model application environments 136 and or individual technology products 124 that have higher scores recorded for the prioritized performance metrics 138 associated with the one or more requirements of the software application 112, regardless of scores recorded for other performance metrics 138. For example, the software application 112 may require high database performance (e.g., quick response times) and high data security as a result of handling sensitive user data. Accordingly, application manager 130 may prioritize the database performance metric and the security performance metric over other performance metrics 138 collected for the model application environments 136. In this case, application manager 130 recommends one or more model application environments 136 that were found to have the highest scores for the database performance metric and the security performance metric. Application manager 130 may be configured to obtain the one or more requirements of the software application 112 in response to receiving a request for the one or more requirements or by automatically determining the one or more requirements by analyzing one or more performance metrics 138 of the software application 112. For example, based on analyzing the software application 112 while running using one or more model application environments 136, application manager may determine that the software application is vulnerable to cyber attacks. This detection may prompt the application manager 130 to prioritize the data security metric for recommending model application environments 136 that were found to have the highest scores related to the data security metric.

In one embodiment, application manager 130 may compare one or more model application environments 136 with the current application environment 120 based on the performance scores of a prioritized performance metric 138 (e.g., database performance, application server performance etc.). If application manager 130 determines that a model application environment 136 has a higher score for the performance metric 138 as compared to the respective score of the performance metric 138 collected for the current application environment 120, application manager 130 may be configured to determine at least one technology product 124 used for a corresponding technology component 122 associated with the performance metric 138 in the determined model application environment 136 that is different from the current technology product 124 used for the technology component 122 in the current application environment 120. Application manager 130 may be configured to recommend using the determined at least one technology product 124 for the technology component 122 to achieve a higher level of performance related to the prioritized performance metric 138.

In an additional or alternative embodiment, application manager 130 may be configured to receive a request for a higher level of performance related to a performance metric 138 associated with at least one technology component 122 as compared to a current level of performance related to the performance metric 138 in the current application environment 120. In response, application manager 130 may be configured to compare one or more model application environments 136 with the current application environment 120 based on the performance scores of the requested performance metric 138. Based on the results of the comparison, application manager 130 may be configured to determine a model application environment 136 that yielded a higher score for the requested performance metric 138 compared to the score of the performance metric 138 in the current application environment 120. Application manager 130 may determine a technology product 124 used for the at least one technology component 122 in the determined model application environment 136 and recommends using the determined technology product 124 for the at least one technology component 122 to achieve the requested higher level of performance related to the performance metric 138.

Figure 2:
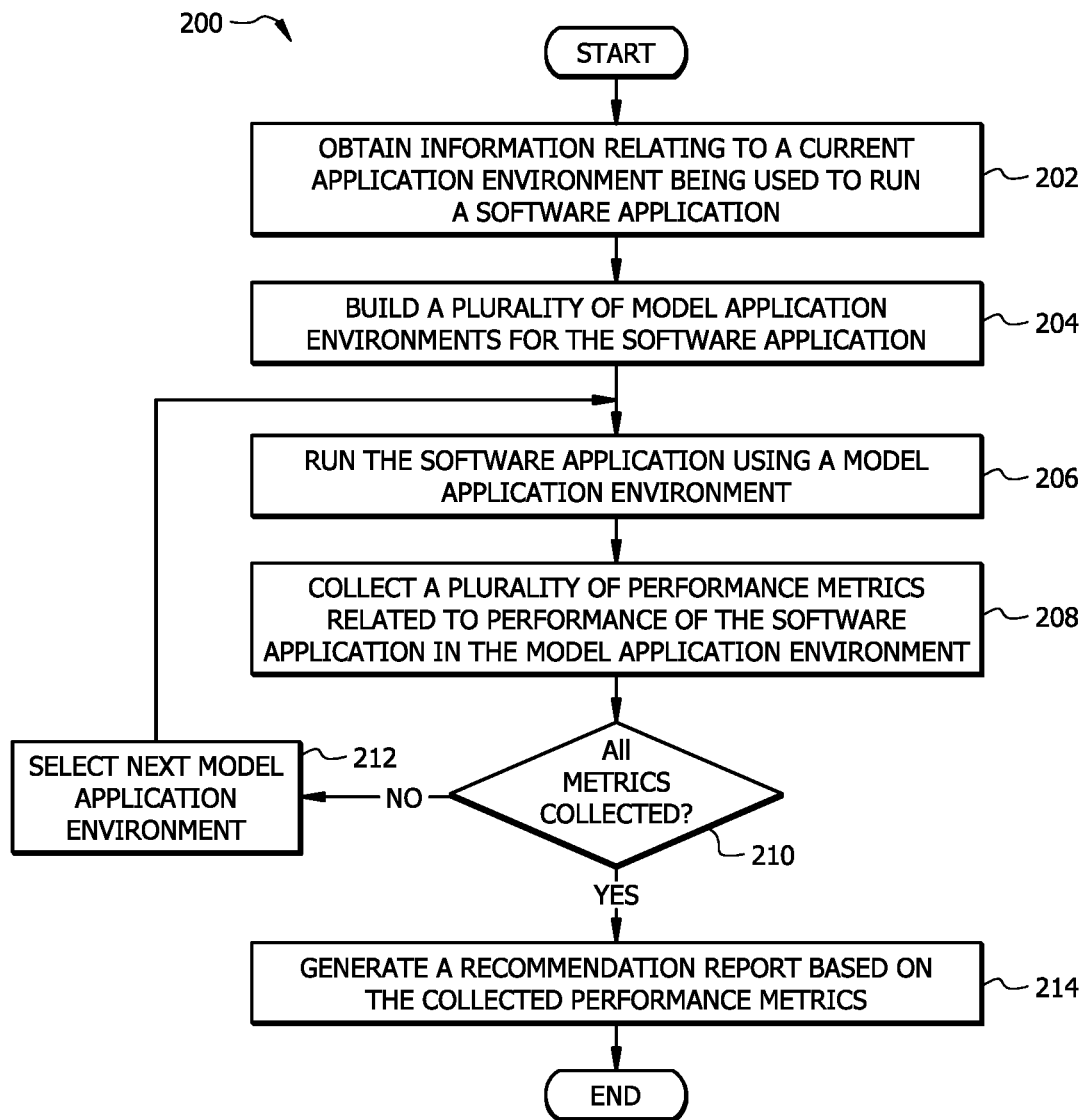
FIG. 2 is a flowchart of an example method for processing an application environment for a software application, in accordance with certain embodiments of the present disclosure.

FIG. 2 is a flowchart of an example method 200 for processing an application environment for a software application, in accordance with certain embodiments of the present disclosure. Method 200 may be performed by application manager 130 as shown in FIG. 1 and described above.

At step 202, application manager 130 obtains information relating to a current application environment 120 being used to run a software application 112. As described above, current application system 110 may run the software application 112 in the current application environment 120. The current application environment 120 may use technology components (shown as 122a-122n), wherein each technology component 122a-122n uses a respective technology product (shown as 124a-124n). The technology components 122a-122n may include one or more hardware technology components, one or more software technology components or a combination there of. For example, each technology component 122a-122n may refer to a type of hardware or software tool used to implement, run and/or support the software application 112. For example, a technology component may include, but is not limited to, a middleware component, an operating system component, a database engine component, an implementation technology component (e.g., coding language used to implement the software application 112), a cloud provider component, a network technology component (e.g., WAN, LAN, VPN etc.), a virtualization technique component and a server less computing technology component. A technology product 124a-124n may refer to a specific hardware or software tool/technology used for a corresponding technology component. For example, Apache Tomcat® can be a technology product used as a middleware component. Thus, the term "technology component" may generally refer to a type of technology product, and the term "technology product" may refer to a specific hardware or software tool used for a respective technology component. In one example case, current application environment 120 may include three technology components 122a, 122b and 122c using respective technology products 124a, 124b and 124c. Technology component 122a may be a middleware component that uses Apache Tomcat server as the specific technology product 124a. Technology component 122b may be a database engine component that uses SQL server as the specific technology product 124b. Technology component 122c may be a virtualization technique component that uses VMware virtual machine as the specific technology product 124c.

Application manager 130 may obtain information relating to the current application environment 120 being used for the software application 112. In one embodiment, application manager 130 may use an application connector to obtain the information relating to the current application environment 120. The application connector may be a software agent designed to run on the current application system 110 and extract information relating to the current application environment 120 from the current application system 110. The information extracted by the application connector may include information relating to the particular technology components 122a-122n of the current application environment 120 and the specific technology products 124a-124n being used for each technology component 122a-122n. In one embodiment, the information extracted by the application connecter may include information relating to one or more performance requirements of the software application with regard to one or more performance metrics 138 including load performance and processing performance. As described below, the information relating to the performance requirements of the software application may be used by application manager 130 to recommend one or more model application environments 136 and/or technology products 124 that suit the performance requirements.

At step 204, application manager 130 builds a plurality of model application environments 136 for the software application 112, based on the information obtained relating to the current application environment 120.

As described above, several alternative technology products 124 are typically available corresponding to each technology component 122a-122n. For example, technology product alternatives for the operating system (OS) component may include, but are not limited to, Windows OS, Linux OS, Redhat OS and Fedora OS. Technology product alternatives for the implementation technology component may include, but are not limited to, C++, Java, C #, Python and JavaScript. Technology product alternatives for the middleware technology component may include, but are not limited to, Apache Tomcat server, JBoss server and Oracle server. Technology product alternatives for the cloud component may include, but are not limited to, Microsoft Azure, Amazon webservices and Google cloud platform. Technology product alternatives for the network component may include, but are not limited to, Local Area Network (LAN), Wireless (WLAN), Wide Area Network (WAN) and Virtual Private Network (VPN). Technology product alternatives for the virtualization technique component may include, but are not limited to, VMware, Microsoft Hyper-V, Openstack and Xen.

As described above, the technology products 124a-124n used for the respective technology components 122a-122n in the current application environment 120 may not be the most optimal for the software application 112. That is, the current application environment 120 may not always yield the performance desired for the software application 112.

Based on the information obtained from the current application system 110, application manager 130 may build a plurality of alternative model application environments 136 that can potentially be used for the software application 112. For example, based on the information obtained from the current application system 110, application manager 130 may determine the technology components 122a-122n that need to be incorporated into an application environment meant for the software application 112. Once, the technology components 122a-122n are identified, application manager 130 may identify the plurality of alternative technology products 124 available for each of the technology components 122a-122n. The alternative technology products 124 identified for each technology component 122a-122n may include the current technology product 124a-124n being used in the current application environment 120 for the technology components 122a-122n. Application manager 130 may build a plurality of model application environments 136 for the software application 112 by selecting for each model application environment 136 a different combination of the technology products 124 for the technology components 122a-122n. That is, each model application environment 136 is built to use a combination of technology products 124 that is different from the combinations of technology products 124 used for other model application environments 136 built for the software application 112. In one embodiment, the model application environments 136 include a copy of the current application environment 120. Application manager 130 builds the copy of the current application environment 120 as part of building the model application environments 136 for comparing with other model application environments 136.

In one example, when the technology components 122a-122n of the current application environment 120 includes a middleware component, a database engine component and a virtualization technique component, application manager 130 may identify alternative technology products 124 for each of a middleware component, a database engine component and a virtualization technique component. Application manager 130 may build a plurality of potential model application environments 136 for the software application 112 by using different combinations of technology products 124 for the middleware component, database engine component and virtualization technique component. For example, application manager 130 may build each model application environment by selecting a different alternative technology product 124 for at least one of the technology components 122a-122n. Additionally, application manager 130 may build a copy of the current application environment 120 by selecting technology products 124a-124n for the technology components 122a-122n.

Application manager 130 may automatically configure each of the model application environments 136 to suit the software application 112. The application manager 130 may obtain information relating to how the software application 112 is configured with respect to one or more parameters (e.g., logging-in, load balancing, database details etc.) in the current application environment 120. Application manager 130 may configure each of the model application environments 136 for the software application 112, based on the configurations in the current application environment 120, for example, to match the configurations in the current application environment 120. Application manager 130 may also configure one or more parameters of a model application environment by modifying the configuration of the parameters in the current application environment 120 to suit the model application environment 136.

Application manager 130 may maintain information relating to performance benchmarks 142 for each technology product 124 under distinct performance conditions such as user traffic and amount of data being handled. A performance benchmark 142 relating to a technology product 124 includes a level of performance provided by the technology product 124 corresponding to at least one performance metric 138. A performance metric 138, as discussed below, may relate to a load performance and/or processing speed performance of the technology product 124. For example, a technology product 124 may be associated with high load performance meaning the technology product 124 can handle a large amount of user traffic and/or large amount of data. Another technology product 124 may be associated with high server performance which may mean that the technology product 124 provides fast server response times. The performance benchmarks 142 of the technology products 124 may allow the application manager 130 to build custom model application environments by selecting one or more technology products 124 that satisfy specific performance requirements of the software application 112. For example, application manager 130 may obtain information relating to at least one performance requirement of the software application 112 corresponding to a technology component 122. For example, application manager 130 may receive a request for a level of performance associated with the technology component 122. Application manager 130 may determine a technology product 124 available for the technology component 122 and that satisfies the performance requirement, based on the performance benchmark 142 stored for the technology product 124. Application manager 130 may build a model application environment 136 for the software application 112 by selecting the technology product 124 for the technology component 122.

Application manager 130 may be configured to evolve to accommodate new and emerging technologies. For example, when a new technology product 124 is added for a technology component 122, application manager 130 may assess whether the newly added technology product 124 can be used in an application environment for the software application 112. For example, when the newly added technology product 124 corresponds to a technology component 122a-122n being used by the current technology environment 120 of the software application 112, application manager 130 may determine that the newly added technology product 124 may be used in the application environment of the software application 112. Additionally or alternatively, application manager 130 may determine whether the newly added technology product 124 satisfies one or more performance requirements of the software application 112. Application manager 130 may build a new model application environment 136 by selecting the newly added technology product 124 for the respective technology component 122. Application manager 130 may build the new model application environment 136 in response to determining that the newly added technology product 124 can be used in the application environment of the software application 112 and/or that the newly added technology product 124 satisfies at least one requirements of the software application 112. In one embodiment, application manager 130 may collect information relating to one or more performance requirements of the software application 112 according to a pre-determined schedule (e.g., periodically). Application manager 130 may detect whether the performance requirements of the software application 112 has changed and build a customized application environment for the software application 112 based on current performance requirements of the software application 112. This may ensure that the current application environment 120 of the software application 112 evolves to accommodate the changing performance requirements of the software application 112.

At step 206, application manager 130 runs the software application 112 using each of the model application environments (including the copy of the current application environment 120) in a simulated environment. Application manager 130 may include a simulator logic that can be configured to host and deploy each of the model application environments 136 (including the current application environment 120) and run the software application 112 in each of the model application environments 136.

At step 208, application manager 130 collects a plurality of performance metrics 138 related to performance of the software application 112 in the current application environment 120 and each of the model application environments 136 while running in the simulated environment. In one embodiment, application manager 130 runs each model application environment 136 in the simulated environment and collects performance metrics 138 for the model application environment 136 before moving on to the next model application environment.

Application manager 130 may collect data relating to a plurality of performance metrics 138 related to performance of the software application in each of the model application environments 136 (including the current application environment 120) while running in the simulated environment. The plurality of performance metrics 138 may include, but are not limited to, one or more of application server performance, performance related to type of data handled by the software application, database performance, data security analysis, input and output analysis and deployment on cloud platforms. Application server performance may relate to response time of the application server at different levels of load (e.g., user traffic, amount of data etc.). Performance data related to the type of data handled by the software application 112 may include information relating to whether the software application 112 handles sensitive data needing a higher level of security and whether a model application environment 136 can handle sensitive data. This performance metric may allow the application manager 130 to recommend secure technology products 124 that can securely handle sensitive user data, such as private cloud product or a virtual machine where the virtualization is done at the hardware level to provide maximum security. Database performance may relate to database response times.

Data relating to data security analysis may include security vulnerabilities (e.g., relating to data security) of the software application 112 in particular model application environments 136. Application manager 130 scans the software application 112 for known vulnerabilities in each model application environment 136 and for potential threats to the application 112. Application manager 130 may determine based on this performance metric whether a particular model application environment 136 is vulnerable to attacks. Data related to deployment on cloud platforms may include information relating to whether the software application 112 can be deployed on cloud platforms. For example, application manager 130 may analyze whether the software application 112 is suitable for deploying on a cloud platform based on running the software application 112 in model application environments 136 including cloud deployments. This performance metric may help the application manager 130 determine whether the software application 112 can be deployed on cloud platforms or is more suitable for a private in-house server or virtual machine deployment.

To measure the performance of the software application 112 in each model application environment 136, application manager 130 may run one or more tests on each model application environment 136 while the simulator logic is running the software application 112 in the model application environment 136. Application manager 130 may collect one or more of the performance metrics 138 described above corresponding to each model application environment 136 as a result of conducting the one or more tests. The tests may include load testing to test the software application 112 at different amounts of load (e.g., user traffic, amount of data etc.). For example, load testing may include simulating simultaneous logins of different numbers of users using different amounts of test data. Additionally or alternatively, the tests may include performance testing to test the overall performance of a model application environment 136 and collect data on performance metrics 142 including availability, response time and stability of the software application 112. In one example, for each model application environment 136, application manager 130 carries out the testing in multiple cycles with different amounts of load. For example, each model application environment 136 is tested initially with 10 k simultaneous user logins and 100 GB of test data. This test cycle is then repeated three times with a replication load factor of 2λ. This means with each test cycle, the load applied is two times that applied in the previous test cycle. In one embodiment, the load size may be customized based on the requirements of the software application 112. In an additional embodiment, application manager 130 tests each model application environment 136 for security vulnerabilities (e.g., data security) and collects data relating to how vulnerable the model application environment 136 is to potential security threats.

At step, 210, application manager 130 checks whether performance metrics 138 have been collected for all the model application environments 136 (including the current application environment 120). If not, method 200 proceeds to step 212, where application manager selects the next model application environment 136 for running the software application 112 in the simulated environment at step 206 and then collects performance metrics 138 for the next model application environment 136. If application manager 130 determines that performance metrics 138 have been collected for all model application environments 136 including the current application environment 120, method 200 proceeds to step 214.

At step 214, application manager 130 generates a recommendation report 140 based on the collected performance metrics 138, wherein the recommendation report 140 includes a recommendation of a different technology product 124 for at least one of the technology components 122a-122n used in the current application environment 120, wherein the different technology product 124 is different from a current technology product 124a-124n used for the at least one technology component 122a-122n in the current application environment 120.

Application manager 130 may analyze the performance metrics 138 collected for each model application environment 136 (including the current application environment 120) and generate the recommendation report 140 based on the analysis. The recommendation report 140 may include a recommendation to use one or more model application environments 136 for the software application 112 that are found to perform better than the current application environment 120 based on the analysis of the performance metrics 138. Additionally or alternatively, the recommendation report 140 may include recommendations to use individual technology products 124 for one or more technology components 122 that satisfy one or more performance requirements of the software application 112.

In order to analyze the performance metrics 138, application manager 130 may segregate the performance metrics 138 collected for each model application environment 136 including the current application environment 120. The segregating may include grouping together data collected for each performance metric 138 for all the model application environments 136. For example, data relating to application server performance metric collected for all model application environments 136 may be grouped together. Similarly, data relating to database performance metric collected for all model application environments 136 may be grouped together. Application manager 130 may compare the model application environments 136 based on each performance metric 138 collected for the respective model application environments 136. For example, the application server performance metric of all model application environments 136 may be compared separately. Similarly, the database performance metric of all model application environments 136 may be compared separately. Application manager 130 may recommend one or more model application environments 136 and/or individual technology products 124 based on results of the comparison.

In one or more embodiments, for each model application environment 136 (including the current application environment 120), application manager 130 assigns a performance score to each performance metric 138 collected for the model application environment 136. Application manager 130 may assign a higher score for a higher level of performance related to a performance metric 138. For example, if a first model application environment 136 is found to be able to handle 500 simultaneous user logins at one time and a second model application environment 136 is found to be able to handle 10k simultaneous user logins at one time, the application performance metric for the second model application environment 136 is assigned a higher performance score than the application performance metric for the first model application environment 136. Application manager 130 may compare the respective scores of each performance metric 138 collected for several model application environments 136. Application manager 130 may recommend a model application environment 136 that is found to have a higher score with regard to one or more performance metrics 138 as compared to the respective scores of the one or more performance metrics 138 collected for other model application environments 136. Following the above example, application manager 130 may recommend the second model application environment 136 for the software application 112 over the first model application environment 136 based on the higher score associated with the application server performance metric collected for the second model application environment 136.

In one or more embodiments, application manager 130 may compare the total performance scores of multiple performance metrics 138 collected for each model application environment 136 and recommend a model application environment 136 that has the highest total performance score for the performance metrics 138. For example, application manager 130 may compare the total performance scores of all performance metrics 138 collected for each model application environment 136 and recommend a model application environment 136 that has the highest total performance score of for the performance metrics 138.

In one or more embodiments, application manager 130 may sort the performance metrics 138 collected for each model application environment 136 (including the current application environment 120) based on one or more requirements of the software application 112, for example, by placing a higher priority on performance metrics 138 that are associated with the one or more requirements of the software application 112. Application manager 130 may recommend one or more model application environments 136 and or individual technology products 124 that have higher scores recorded for the prioritized performance metrics 138 associated with the one or more requirements of the software application 112, regardless of scores recorded for other performance metrics 138. For example, the software application 112 may require high database performance (e.g., quick response times) and high data security as a result of handling sensitive user data. Accordingly, application manager 130 may prioritize the database performance metric and the security performance metric over other performance metrics 138 collected for the model application environments 136. In this case, application manager 130 recommends one or more model application environments 136 that were found to have the highest scores for the database performance metric and the security performance metric. Application manager 130 may obtain the one or more requirements of the software application 112 in response to receiving a request for the one or more requirements or by automatically determining the one or more requirements by analyzing one or more performance metrics 138 of the software application 112. For example, based on analyzing the software application 112 while running using one or more model application environments 136, application manager may determine that the software application is vulnerable to cyber attacks. This detection may prompt the application manager 130 to prioritize the data security metric for recommending model application environments 136 that were found to have the highest scores related to the data security metric.

In one embodiment, application manager 130 may compare one or more model application environments 136 with the current application environment 120 based on the performance scores of a prioritized performance metric 138 (e.g., database performance, application server performance etc.). If application manager 130 determines that a model application environment 136 has a higher score for the performance metric 138 as compared to the respective score of the performance metric 138 collected for the current application environment 120, application manager 130 may determine at least one technology product 124 used for a corresponding technology component 122 associated with the performance metric 138 in the determined model application environment 136 that is different from the current technology product 124 used for the technology component 122 in the current application environment 120. Application manager 130 recommend using the determined at least one technology product 124 for the technology component 122 to achieve a higher level of performance related to the prioritized performance metric 138.

In an additional or alternative embodiment, application manager 130 may receive a request for a higher level of performance related to a performance metric 138 associated with at least one technology component 122 as compared to a current level of performance related to the performance metric 138 in the current application environment 120. In response, application manager 130 may compare one or more model application environments 136 with the current application environment 120 based on the performance scores of the requested performance metric 138. Based on the results of the comparison, application manager 130 may determine a model application environment 136 that yielded a higher score for the requested performance metric 138 compared to the score of the performance metric 138 in the current application environment 120. Application manager 130 may determine a technology product 124 used for the at least one technology component 122 in the determined model application environment 136 and recommends using the determined technology product 124 for the at least one technology component 122 to achieve the requested higher level of performance related to the performance metric 138.

Figure 3:
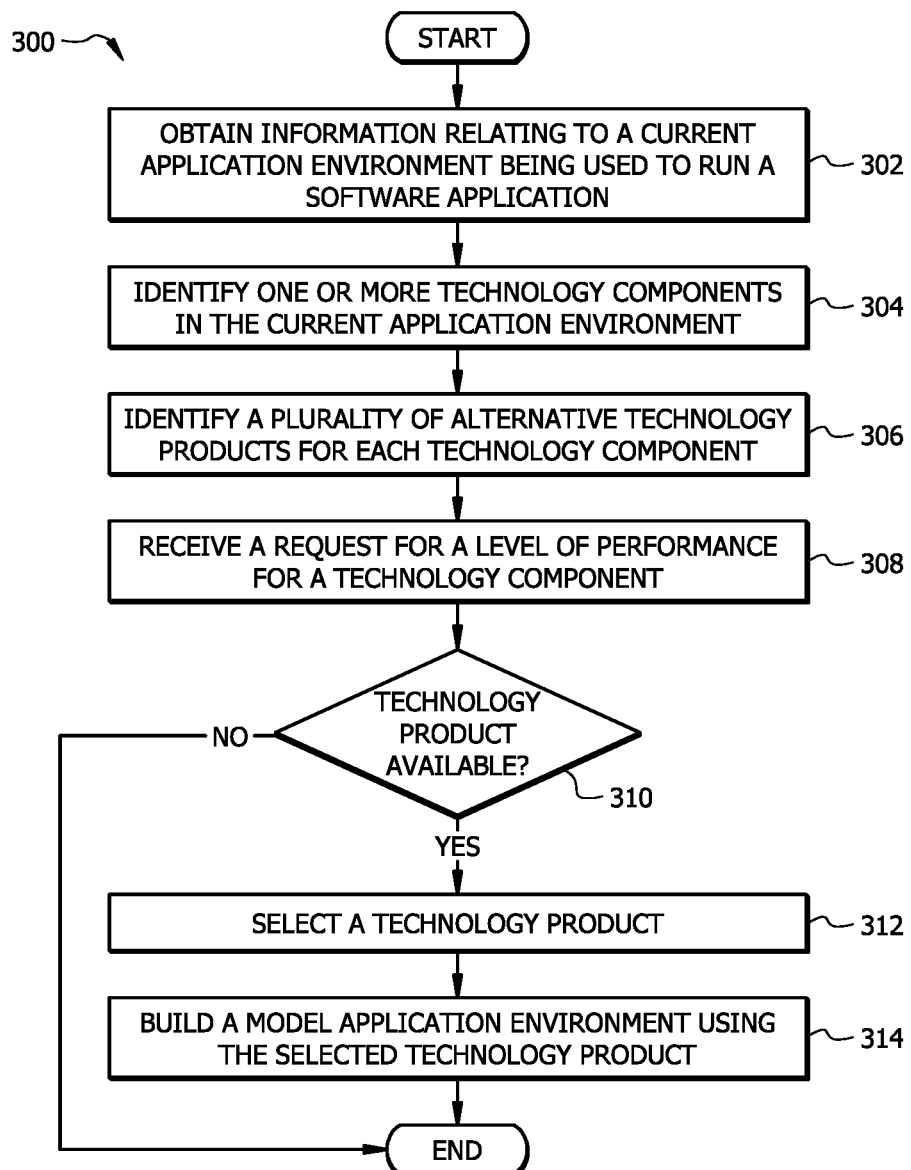
FIG. 3 is a flowchart of an example method for building application environments for a software application, in accordance with certain embodiments of the present disclosure.

FIG. 3 is a flowchart of an example method 300 for building application environments for a software application, in accordance with certain embodiments of the present disclosure. Method 300 may be performed by application manager 130 as shown in FIG. 1 and described above.

At step 302, application manager 130 obtains information relating to a current application environment 120 being used to run a software application 112. As described above, current application system 110 may run the software application 112 in the current application environment 120. The current application environment 120 may use technology components (shown as 122*a*-122*n*), wherein each technology component 122*a*-122*n* uses a respective technology product (shown as 124*a*-124*n*) of a plurality of alternative technology products available for the technology component 122*a*-122*n*. The technology components 122*a*-122*n* may include one or more hardware technology components, one or more software technology components or a combination there of. For example, each technology component 122*a*-122*n* may refer to a type of hardware or software tool used to implement, run and/or support the software application 112. For example, a technology component may include, but is not limited to, a middleware component, an operating system component, a database engine component, an implementation technology component (e.g., coding language used to implement the software application 112), a cloud provider component, a network technology component (e.g., WAN, LAN, VPN etc.), a virtualization technique component and a server less computing technology component. A technology product 124*a*-124*n* may refer to a specific hardware or software tool/technology used for a corresponding technology component. For example, Apache Tomcat® can be a technology product used as a middleware component. Thus, the term "technology component" may generally refer to a type of technology product, and the term "technology product" may refer to a specific hardware or software tool used for a respective technology component. In one example case, current application environment 120 may include three technology components 122*a*, 122*b* and 122*c* using respective technology products 124*a*, 124*b* and 124*c*. Technology component 122*a* may be a middleware component that uses Apache Tomcat server as the specific technology product 124*a*. Technology component 122*b* may be a database engine component that uses SQL server as the specific technology product 124*b*. Technology component 122*c* may be a virtualization technique component that uses VMware virtual machine as the specific technology product 124*c*.

Application manager 130 may obtain information relating to the current application environment 120 being used for the software application 112. In one embodiment, application manager 130 may use an application connector to obtain the information relating to the current application environment 120. The application connector may be a software agent designed to run on the current application system 110 and extract information relating to the current application environment 120 from the current application system 110. The information extracted by the application connector may include information relating to the particular technology components 122*a*-122*n* of the current application environment 120 and the specific technology products 124*a*-124*n* being used for each technology component 122*a*-122*n*. In one embodiment, the information extracted by the application connecter may include information relating to one or more performance requirements of the software application with regard to one or more performance metrics 138 including load performance and processing performance. The information relating to the performance requirements of the software application may be used by application manager 130 to recommend one or more model application environments 136 and/or technology products 124 that suit the performance requirements.

At step 304, based on the obtained information related to the current application environment 120, application manager 130 identifies the one or more technology components 122*a*-122*n* being used in the current application environment 120 to run the software application 112.

At step 306, based on the obtained information related to the current application environment 120, application manager 130 further identifies a plurality of alternative technology products available for each of the one or more technology components 120*a*-120*n* used in the current application environment 120.

As described above, several alternative technology products 124 are typically available corresponding to each technology component 122*a*-122*n*. For example, technology product alternatives for the operating system (OS) component may include, but are not limited to, Windows OS, Linux OS, Redhat OS and Fedora OS. Technology product alternatives for the implementation technology component may include, but are not limited to, C++, Java, C #, Python and JavaScript. Technology product alternatives for the middleware technology component may include, but are not limited to, Apache Tomcat server, JBoss server and Oracle server. Technology product alternatives for the cloud component may include, but are not limited to, Microsoft Azure, Amazon webservices and Google cloud platform. Technology product alternatives for the network component may include, but are not limited to, Local Area Network (LAN), Wireless (WLAN), Wide Area Network (WAN) and Virtual Private Network (VPN). Technology product alternatives for the virtualization technique component may include, but are not limited to, VMware, Microsoft Hyper-V, Openstack and Xen.

Based on the information obtained from the current application system 110, application manager 130 may build a plurality of alternative model application environments 136 that can potentially be used for the software application 112. For example, based on the information obtained from the current application system 110, application manager 130 may determine the technology components 122a-122n that need to be incorporated into an application environment meant for the software application 112. Once, the technology components 122a-122n are identified, application manager 130 may identify the plurality of alternative technology products 124 available for each of the technology components 122a-122n. The alternative technology products 124 identified for each technology component 122a-122n may include the current technology product 124a-124n being used in the current application environment 120 for the technology components 122a-122n. Application manager 130 may build a plurality of model application environments 136 for the software application 112 by selecting for each model application environment 136 a different combination of the technology products 124 for the technology components 122a-122n. That is, each model application environment 136 is built to use a combination of technology products 124 that is different from the combinations of technology products 124 used for other model application environments 136 built for the software application 112. In one embodiment, the model application environments 136 include a copy of the current application environment 120. Application manager 130 builds the copy of the current application environment 120 as part of building the model application environments 136 for comparing with other model application environments 136.

In one example, when the technology components 122a-122n of the current application environment 120 includes a middleware component, a database engine component and a virtualization technique component, application manager 130 may identify alternative technology products 124 for each of a middleware component, a database engine component and a virtualization technique component. Application manager 130 may build a plurality of potential model application environments 136 for the software application 112 by using different combinations of technology products 124 for the middleware component, database engine component and virtualization technique component. For example, application manager 130 may build each model application environment by selecting a different alternative technology product 124 for at least one of the technology components 122a-122n. Additionally, application manager 130 may build a copy of the current application environment 120 by selecting technology products 124a-124n for the technology components 122a-122n.

Application manager 130 may automatically configure each of the model application environments 136 to suit the software application 112. The application manager 130 may obtain information relating to how the software application 112 is configured with respect to one or more parameters (e.g., logging-in, load balancing, database details etc.) in the current application environment 120. Application manager 130 may configure each of the model application environments 136 for the software application 112, based on the configurations in the current application environment 120, for example, to match the configurations in the current application environment 120. Application manager 130 may also configure one or more parameters of a model application environment by modifying the configuration of the parameters in the current application environment 120 to suit the model application environment 136.

At step 308, application manager 130 receives a request for a level of performance associated with a technology component 120a-120n.

Application manager 130 may maintain information relating to performance benchmarks 142 for each technology product 124 under distinct performance conditions such as user traffic and amount of data being handled. A performance benchmark 142 relating to a technology product 124 includes a level of performance provided by the technology product 124 corresponding to at least one performance metric 138. A performance metric 138, as discussed below, may relate to a load performance and/or processing speed performance of the technology product 124. For example, a technology product 124 may be associated with high load performance meaning the technology product 124 can handle a large amount of user traffic and/or large amount of data. Another technology product 124 may be associated with high server performance which may mean that the technology product 124 provides fast server response times. The performance benchmarks 142 of the technology products 124 may allow the application manager 130 to build custom model application environments by selecting one or more technology products 124 that satisfy specific performance requirements of the software application 112. For example, application manager 130 may obtain information relating to at least one performance requirement of the software application 112 corresponding to a technology component 122. For example, application manager 130 may receive a request for a level of performance associated with the technology component 122.

At step 310, Application manager 130 may determine whether a technology product 124 is available for the technology component 122 that satisfies the performance requirement associated with the requested level of performance, based on performance benchmarks 142 stored for the alternative technology products 124 available for the technology component 122. If a suitable technology product 124 is not available, method 300 ends here. However, if application manager 130 determines a technology product 124 available for the technology component 122 that satisfies the requested level of performance, method 300 proceeds to step 312, where application manager 130 selects the determined technology product 124.

At step 314, application manager 130 builds a model application environment 136 for the software application 112 by selecting the technology product 124 for the technology component 122.

In one or more embodiments, application manager 130 may be configured to evolve to accommodate new and emerging technologies. For example, when a new technology product 124 is added for a technology component 122, application manager 130 may assess whether the newly added technology product 124 can be used in an application environment for the software application 112. For example, when the newly added technology product 124 corresponds to a technology component 122a-122n being used by the current technology environment 120 of the software application 112, application manager 130 may determine that the newly added technology product 124 may be used in the application environment of the software application 112. Additionally or alternatively, application manager 130 may determine whether the newly added technology product 124 satisfies one or more performance requirements of the software application 112. Application manager 130 may build a new model application environment 136 by selecting the newly added technology product 124 for the respective technology component 122. Application manager 130 may build the new model application environment 136 in response to determining that the newly added technology product 124 can be used in the application environment of the software application 112 and/or that the newly added technology product 124 satisfies at least one requirements of the software application 112. In one embodiment, application manager 130 may collect information relating to one or more performance requirements of the software application 112 according to a pre-determined schedule (e.g., periodically). Application manager 130 may detect whether the performance requirements of the software application 112 has changed and build a customized application environment for the software application 112 based on current performance requirements of the software application 112. This may ensure that the current application environment 120 of the software application 112 evolves to accommodate the changing performance requirements of the software application 112.

Figure 4:
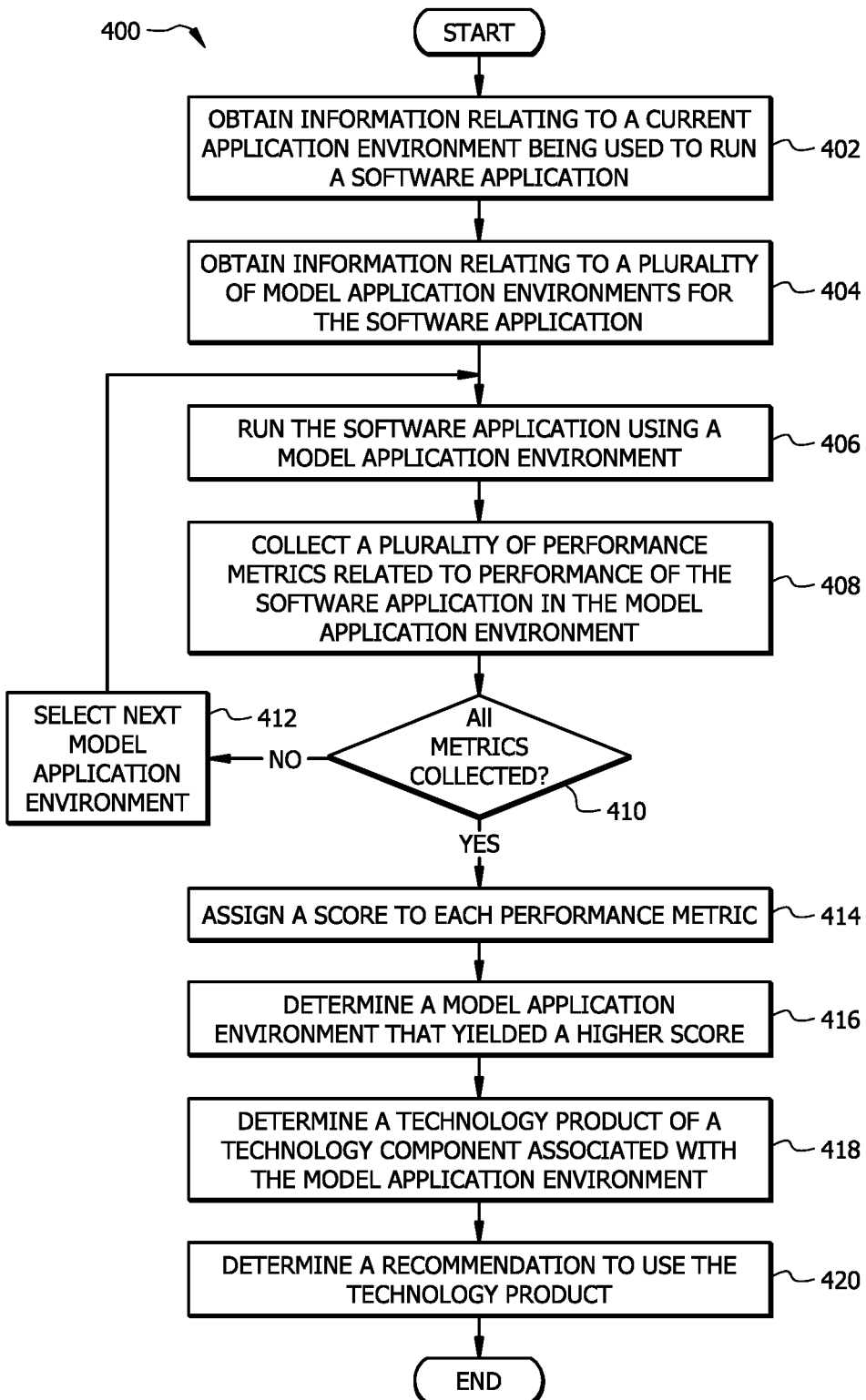
FIG. 4 is a flowchart of an example method for improving an application environment for a software application, in accordance with certain embodiments of the present disclosure.

FIG. 4 is a flowchart of an example method 400 for improving an application environment for a software application, in accordance with certain embodiments of the present disclosure. Method 400 may be performed by application manager 130 as shown in FIG. 1 and described above.

At step 402, application manager 130 obtains information relating to a current application environment 120 being used to run a software application 112. As described above, current application system 110 may run the software application 112 in the current application environment 120. The current application environment 120 may use technology components (shown as 122a-122n), wherein each technology component 122a-122n uses a respective technology product (shown as 124a-124n). The technology components 122a-122n may include one or more hardware technology components, one or more software technology components or a combination there of. For example, each technology component 122a-122n may refer to a type of hardware or software tool used to implement, run and/or support the software application 112. For example, a technology component may include, but is not limited to, a middleware component, an operating system component, a database engine component, an implementation technology component (e.g., coding language used to implement the software application 112), a cloud provider component, a network technology component (e.g., WAN, LAN, VPN etc.), a virtualization technique component and a server less computing technology component. A technology product 124a-124n may refer to a specific hardware or software tool/ technology used for a corresponding technology component. For example, Apache Tomcat® can be a technology product used as a middleware component. Thus, the term "technology component" may generally refer to a type of technology product, and the term "technology product" may refer to a specific hardware or software tool used for a respective technology component. In one example case, current application environment 120 may include three technology components 122a, 122b and 122c using respective technology products 124a, 124b and 124c. Technology component 122a may be a middleware component that uses Apache Tomcat server as the specific technology product 124a. Technology component 122b may be a database engine component that uses SQL server as the specific technology product 124b. Technology component 122c may be a virtualization technique component that uses VMware virtual machine as the specific technology product 124c.

Application manager 130 may obtain information relating to the current application environment 120 being used for the software application 112. In one embodiment, application manager 130 may use an application connector to obtain the information relating to the current application environment 120. The application connector may be a software agent designed to run on the current application system 110 and extract information relating to the current application environment 120 from the current application system 110. The information extracted by the application connector may include information relating to the particular technology components 122a-122n of the current application environment 120 and the specific technology products 124a-124n being used for each technology component 122a-122n. In one embodiment, the information extracted by the application connecter may include information relating to one or more performance requirements of the software application with regard to one or more performance metrics 138 including load performance and processing performance. As described below, the information relating to the performance requirements of the software application may be used by application manager 130 to recommend one or more model application environments 136 and/or technology products 124 that suit the performance requirements.

At step 404, application manager 130 obtains information relating to a plurality of model application environments 136 built for the software application 112 based on the information obtained relating to the current application environment 120.

As described above, several alternative technology products 124 are typically available corresponding to each technology component 122a-122n. For example, technology product alternatives for the operating system (OS) component may include, but are not limited to, Windows OS, Linux OS, Redhat OS and Fedora OS. Technology product alternatives for the implementation technology component may include, but are not limited to, C++, Java, C #, Python and JavaScript. Technology product alternatives for the middleware technology component may include, but are not limited to, Apache Tomcat server, JBoss server and Oracle server. Technology product alternatives for the cloud component may include, but are not limited to, Microsoft Azure, Amazon webservices and Google cloud platform. Technology product alternatives for the network component may include, but are not limited to, Local Area Network (LAN), Wireless (WLAN), Wide Area Network (WAN) and Virtual Private Network (VPN). Technology product alternatives for the virtualization technique component may include, but are not limited to, VMware, Microsoft Hyper-V, Openstack and Xen.

As described above, the technology products 124a-124n used for the respective technology components 122a-122n in the current application environment 120 may not be the most optimal for the software application 112. That is, the current application environment 120 may not always yield the performance desired for the software application 112.

Based on the information obtained from the current application system 110, application manager 130 may build a plurality of alternative model application environments 136 that can potentially be used for the software application 112. For example, based on the information obtained from the current application system 110, application manager 130 may determine the technology components 122a-122n that need to be incorporated into an application environment meant for the software application 112. Once, the technology components 122a-122n are identified, application manager 130 may identify the plurality of alternative technology products 124 available for each of the technology components 122a-122n. The alternative technology products 124 identified for each technology component 122a-122n may include the current technology product 124a-124n being used in the current application environment 120 for the technology components 122a-122n. Application manager 130 may build a plurality of model application environments 136 for the software application 112 by selecting for each model application environment 136 a different combination of the technology products 124 for the technology components 122a-122n. That is, each model application environment 136 is built to use a combination of technology products 124 that is different from the combinations of technology products 124 used for other model application environments 136 built for the software application 112. In one embodiment, the model application environments 136 include a copy of the current application environment 120. Application manager 130 builds the copy of the current application environment 120 as part of building the model application environments 136 for comparing with other model application environments 136.

In one example, when the technology components 122a-122n of the current application environment 120 includes a middleware component, a database engine component and a virtualization technique component, application manager 130 may identify alternative technology products 124 for each of a middleware component, a database engine component and a virtualization technique component. Application manager 130 may build a plurality of potential model application environments 136 for the software application 112 by using different combinations of technology products 124 for the middleware component, database engine component and virtualization technique component. For example, application manager 130 may build each model application environment by selecting a different alternative technology product 124 for at least one of the technology components 122a-122n. Additionally, application manager 130 may build a copy of the current application environment 120 by selecting technology products 124a-124n for the technology components 122a-122n.

Application manager 130 may automatically configure each of the model application environments 136 to suit the software application 112. The application manager 130 may obtain information relating to how the software application 112 is configured with respect to one or more parameters (e.g., logging-in, load balancing, database details etc.) in the current application environment 120. Application manager 130 may configure each of the model application environments 136 for the software application 112, based on the configurations in the current application environment 120, for example, to match the configurations in the current application environment 120. Application manager 130 may also configure one or more parameters of a model application environment by modifying the configuration of the parameters in the current application environment 120 to suit the model application environment 136.

Application manager 130 may maintain information relating to performance benchmarks 142 for each technology product 124 under distinct performance conditions such as user traffic and amount of data being handled. A performance benchmark 142 relating to a technology product 124 includes a level of performance provided by the technology product 124 corresponding to at least one performance metric 138. A performance metric 138, as discussed below, may relate to a load performance and/or processing speed performance of the technology product 124. For example, a technology product 124 may be associated with high load performance meaning the technology product 124 can handle a large amount of user traffic and/or large amount of data. Another technology product 124 may be associated with high server performance which may mean that the technology product 124 provides fast server response times. The performance benchmarks 142 of the technology products 124 may allow the application manager 130 to build custom model application environments by selecting one or more technology products 124 that satisfy specific performance requirements of the software application 112. For example, application manager 130 may obtain information relating to at least one performance requirement of the software application 112 corresponding to a technology component 122. For example, application manager 130 may receive a request for a level of performance associated with the technology component 122. Application manager 130 may determine a technology product 124 available for the technology component 122 and that satisfies the performance requirement, based on the performance benchmark 142 stored for the technology product 124. Application manager 130 may build a model application environment 136 for the software application 112 by selecting the technology product 124 for the technology component 122.

Application manager 130 may be configured to evolve to accommodate new and emerging technologies. For example, when a new technology product 124 is added for a technology component 122, application manager 130 may assess whether the newly added technology product 124 can be used in an application environment for the software application 112. For example, when the newly added technology product 124 corresponds to a technology component 122a-122n being used by the current technology environment 120 of the software application 112, application manager 130 may determine that the newly added technology product 124 may be used in the application environment of the software application 112. Additionally or alternatively, application manager 130 may determine whether the newly added technology product 124 satisfies one or more performance requirements of the software application 112. Application manager 130 may build a new model application environment 136 by selecting the newly added technology product 124 for the respective technology component 122. Application manager 130 may build the new model application environment 136 in response to determining that the newly added technology product 124 can be used in the application environment of the software application 112 and/or that the newly added technology product 124 satisfies at least one requirements of the software application 112. In one embodiment, application manager 130 may collect information relating to one or more performance requirements of the software application 112 according to a pre-determined schedule (e.g., periodically). Application manager 130 may detect whether the performance requirements of the software application 112 has changed and build a customized application environment for the software application 112 based on current performance requirements of the software application 112. This may ensure that the current application environment 120 of the software application 112 evolves to accommodate the changing performance requirements of the software application 112.

At step 406, application manager 130 runs the software application 112 using each of the model application environments (including the copy of the current application environment 120) in a simulated environment. Application manager 130 may include a simulator logic that can be configured to host and deploy each of the model application environments 136 (including the current application environment 120) and run the software application 112 in each of the model application environments 136.

At step 408, application manager 130 collects a plurality of performance metrics 138 related to performance of the software application 112 in the current application environment 120 and each of the model application environments 136 while running in the simulated environment. In one embodiment, application manager 130 runs each model application environment 136 in the simulated environment and collects performance metrics 138 for the model application environment 136 before moving on to the next model application environment.

Application manager 130 may collect data relating to a plurality of performance metrics 138 related to performance of the software application in each of the model application environments 136 (including the current application environment 120) while running in the simulated environment. The plurality of performance metrics 138 may include, but are not limited to, one or more of application server performance, performance related to type of data handled by the software application, database performance, data security analysis, input and output analysis and deployment on cloud platforms. Application server performance may relate to response time of the application server at different levels of load (e.g., user traffic, amount of data etc.). Performance data related to the type of data handled by the software application 112 may include information relating to whether the software application 112 handles sensitive data needing a higher level of security and whether a model application environment 136 can handle sensitive data. This performance metric may allow the application manager 130 to recommend secure technology products 124 that can securely handle sensitive user data, such as private cloud product or a virtual machine where the virtualization is done at the hardware level to provide maximum security. Database performance may relate to database response times. Data relating to data security analysis may include security vulnerabilities (e.g., relating to data security) of the software application 112 in particular model application environments 136. Application manager 130 scans the software application 112 for known vulnerabilities in each model application environment 136 and for potential threats to the application 112. Application manager 130 may determine based on this performance metric whether a particular model application environment 136 is vulnerable to attacks. Data related to deployment on cloud platforms may include information relating to whether the software application 112 can be deployed on cloud platforms. For example, application manager 130 may analyze whether the software application 112 is suitable for deploying on a cloud platform based on running the software application 112 in model application environments 136 including cloud deployments. This performance metric may help the application manager 130 determine whether the software application 112 can be deployed on cloud platforms or is more suitable for a private in-house server or virtual machine deployment.

To measure the performance of the software application 112 in each model application environment 136, application manager 130 may run one or more tests on each model application environment 136 while the simulator logic is running the software application 112 in the model application environment 136. Application manager 130 may collect one or more of the performance metrics 138 described above corresponding to each model application environment 136 as a result of conducting the one or more tests. The tests may include load testing to test the software application 112 at different amounts of load (e.g., user traffic, amount of data etc.). For example, load testing may include simulating simultaneous logins of different numbers of users using different amounts of test data. Additionally or alternatively, the tests may include performance testing to test the overall performance of a model application environment 136 and collect data on performance metrics 142 including availability, response time and stability of the software application 112. In one example, for each model application environment 136, application manager 130 carries out the testing in multiple cycles with different amounts of load. For example, each model application environment 136 is tested initially with 10 k simultaneous user logins and 100 GB of test data. This test cycle is then repeated three times with a replication load factor of 2×. This means with each test cycle, the load applied is two times that applied in the previous test cycle. In one embodiment, the load size may be customized based on the requirements of the software application 112. In an additional embodiment, application manager 130 tests each model application environment 136 for security vulnerabilities (e.g., data security) and collects data relating to how vulnerable the model application environment 136 is to potential security threats.

At step, 410, application manager 130 checks whether performance metrics 138 have been collected for all the model application environments 136 (including the current application environment 120). If not, method 400 proceeds to step 412, where application manager selects the next model application environment 136 for running the software application 112 in the simulated environment at step 206 and then collects performance metrics 138 for the next model application environment 136. If application manager 130 determines that performance metrics 138 have been collected for all model application environments 136 including the current application environment 120, method 400 proceeds to step 414.

At step 414, application manager 130 assigns a score to each of the performance metrics 138 collected for each of the model application environments including the current application environment 120, wherein a higher score is assigned to a higher level of performance related to the performance metric 138.

As described above, Application manager 130 may analyze the performance metrics 138 collected for each model application environment 136 (including the current application environment 120) and generate a recommendation report 140 based on the analysis. The recommendation report 140 may include a recommendation to use one or more model application environments 136 for the software application 112 that are found to perform better than the current application environment 120 based on the analysis of the performance metrics 138. Additionally or alternatively, the recommendation report 140 may include recommendations to use individual technology products 124 for one or more technology components 122 that satisfy one or more performance requirements of the software application 112.

For each model application environment 136 (including the current application environment 120), application manager 130 assigns a performance score to each performance metric 138 collected for the model application environment 136. Application manager 130 may assign a higher score for a higher level of performance related to a performance metric 138. For example, if a first model application environment 136 is found to be able to handle 500 simultaneous user logins at one time and a second model application environment 136 is found to be able to handle 10k simultaneous user logins at one time, the application performance metric for the second model application environment 136 is assigned a higher performance score than the application performance metric for the first model application environment 136. Application manager 130 may compare the respective scores of each performance metric 138 collected for several model application environments 136. Application manager 130 may recommend a model application environment 136 that is found to have a higher score with regard to one or more performance metrics 138 as compared to the respective scores of the one or more performance metrics 138 collected for other model application environments 136. Following the above example, application manager 130 may recommend the second model application environment 136 for the software application 112 over the first model application environment 136 based on the higher score associated with the application server performance metric collected for the second model application environment 136.

At step 416, application manager 130 determines a model application environment 136 that yielded a higher score for a performance metric 138 compared to the score of the performance metric 138 in the current application environment. For example, application manager 130 may compare one or more model application environments 136 with the current application environment 120 based on the performance scores of a prioritized performance metric 138 (e.g., database performance, application server performance etc.).

At step 418, when application manager 130 determines that the model application environment 136 has a higher score for the performance metric 138 as compared to the respective score of the performance metric 138 collected for the current application environment 120, application manager 130 determines at least one technology product 124 used for a corresponding technology component 122 associated with the performance metric 138 in the determined model application environment 136 that is different from the current technology product 124 used for the technology component 122 in the current application environment 120.

At step 420, Application manager 130 recommends using the determined at least one technology product 124 for the technology component 122 in the application environment of the software application 112, to achieve a higher level of performance related to the performance metric 138.

In additional or alternative embodiments, application manager 130 may segregate the performance metrics 138 collected for each model application environment 136 including the current application environment 120. The segregating may include grouping together data collected for each performance metric 138 for all the model application environments 136. For example, data relating to application server performance metric collected for all model application environments 136 may be grouped together. Similarly, data relating to database performance metric collected for all model application environments 136 may be grouped together. Application manager 130 may compare the model application environments 136 based on each performance metric 138 collected for the respective model application environments 136, for example, based on performance scores of the performance metric 138 collected for the model application environments. For example, the application server performance metric of all model application environments 136 may be compared separately. Similarly, the database performance metric of all model application environments 136 may be compared separately. Application manager 130 may recommend one or more model application environments 136 and/or individual technology products 124 based on results of the comparison.

In one or more embodiments, application manager 130 may compare the total performance scores of multiple performance metrics 138 collected for each model application environment 136 and recommend a model application environment 136 that has the highest total performance score for the performance metrics 138. For example, application manager 130 may compare the total performance scores of all performance metrics 138 collected for each model application environment 136 and recommend a model application environment 136 that has the highest total performance score of for the performance metrics 138.

In one or more embodiments, application manager 130 may sort the performance metrics 138 collected for each model application environment 136 (including the current application environment 120) based on one or more requirements of the software application 112, for example, by placing a higher priority on performance metrics 138 that are associated with the one or more requirements of the software application 112. Application manager 130 may recommend one or more model application environments 136 and or individual technology products 124 that have higher scores recorded for the prioritized performance metrics 138 associated with the one or more requirements of the software application 112, regardless of scores recorded for other performance metrics 138. For example, the software application 112 may require high database performance (e.g., quick response times) and high data security as a result of handling sensitive user data. Accordingly, application manager 130 may prioritize the database performance metric and the security performance metric over other performance metrics 138 collected for the model application environments 136. In this case, application manager 130 recommends one or more model application environments 136 that were found to have the highest scores for the database performance metric and the security performance metric. Application manager 130 may obtain the one or more requirements of the software application 112 in response to receiving a request for the one or more requirements or by automatically determining the one or more requirements by analyzing one or more performance metrics 138 of the software application 112. For example, based on analyzing the software application 112 while running using one or more model application environments 136, application manager may determine that the software application is vulnerable to cyber attacks. This detection may prompt the application manager 130 to prioritize the data security metric for recommending model application environments 136 that were found to have the highest scores related to the data security metric.

In an additional or alternative embodiment, application manager 130 may receive a request for a higher level of performance related to a performance metric 138 associated with at least one technology component 122 as compared to a current level of performance related to the performance metric 138 in the current application environment 120. In response, application manager 130 may compare one or more model application environments 136 with the current application environment 120 based on the performance scores of the requested performance metric 138. Based on the results of the comparison, application manager 130 may determine a model application environment 136 that yielded a higher score for the requested performance metric 138 compared to the score of the performance metric 138 in the current application environment 120. Application manager 130 may determine a technology product 124 used for the at least one technology component 122 in the determined model application environment 136 and recommends using the determined technology product 124 for the at least one technology component 122 to achieve the requested higher level of performance related to the performance metric 138.

Figure 5:
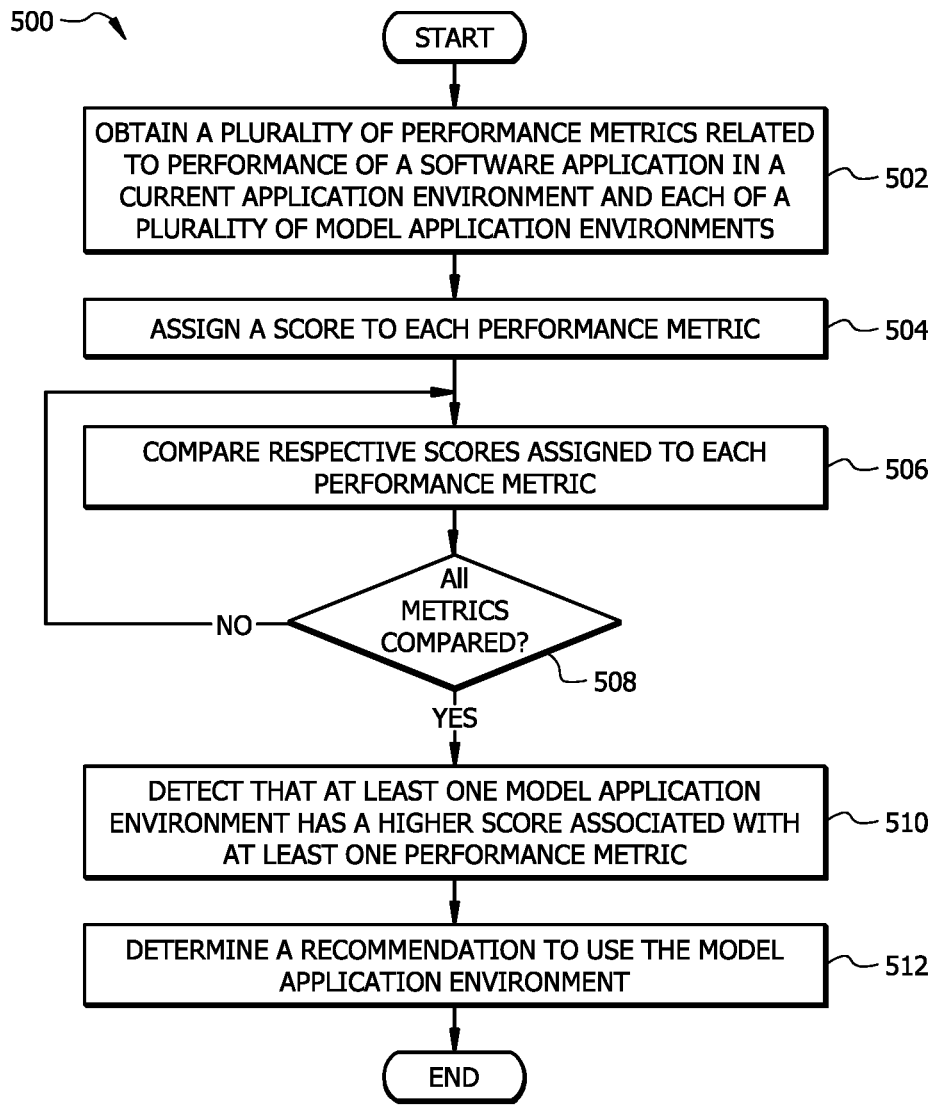
FIG. 5 is a flowchart of an example method for analyzing performance metrics collected for model application environments of a software application, in accordance with certain embodiments of the present disclosure.

FIG. 5 is a flowchart of an example method 500 for analyzing performance metrics collected for model application environments of a software application, in accordance with certain embodiments of the present disclosure. Method 500 may be performed by application manager 130 as shown in FIG. 1 and described above.

At step 502, application manager 130 obtains information about a plurality of performance metrics 138 related to performance of a software application 112 in a current application environment 120 and each of a plurality of model application environments 136.

As described above, current application system 110 may run the software application 112 in the current application environment 120. The current application environment 120 may use technology components (shown as 122a-122n), wherein each technology component 122a-122n uses a respective technology product (shown as 124a-124n). The technology components 122a-122n may include one or more hardware technology components, one or more software technology components or a combination there of. For example, each technology component 122a-122n may refer to a type of hardware or software tool used to implement, run and/or support the software application 112. For example, a technology component may include, but is not limited to, a middleware component, an operating system component, a database engine component, an implementation technology component (e.g., coding language used to implement the software application 112), a cloud provider component, a network technology component (e.g., WAN, LAN, VPN etc.), a virtualization technique component and a server less computing technology component. A technology product 124a-124n may refer to a specific hardware or software tool/technology used for a corresponding technology component. For example, Apache Tomcat® can be a technology product used as a middleware component. Thus, the term "technology component" may generally refer to a type of technology product, and the term "technology product" may refer to a specific hardware or software tool used for a respective technology component. In one example case, current application environment 120 may include three technology components 122a, 122b and 122c using respective technology products 124a, 124b and 124c. Technology component 122a may be a middleware component that uses Apache Tomcat server as the specific technology product 124a. Technology component 122b may be a database engine component that uses SQL server as the specific technology product 124b. Technology component 122c may be a virtualization technique component that uses VMware virtual machine as the specific technology product 124c.

Application manager 130 may obtain information relating to the current application environment 120 being used for the software application 112. In one embodiment, application manager 130 may use an application connector to obtain the information relating to the current application environment 120. The application connector may be a software agent designed to run on the current application system 110 and extract information relating to the current application environment 120 from the current application system 110. The information extracted by the application connector may include information relating to the particular technology components 122a-122n of the current application environment 120 and the specific technology products 124a-124n being used for each technology component 122a-122n. In one embodiment, the information extracted by the application connecter may include information relating to one or more performance requirements of the software application with regard to one or more performance metrics 138 including load performance and processing performance. As described below, the information relating to the performance requirements of the software application may be used by application manager 130 to recommend one or more model application environments 136 and/or technology products 124 that suit the performance requirements.

Several alternative technology products 124 are typically available corresponding to each technology component 122a-122n. For example, technology product alternatives for the operating system (OS) component may include, but are not limited to, Windows OS, Linux OS, Redhat OS and Fedora OS. Technology product alternatives for the implementation technology component may include, but are not limited to, C++, Java, C #, Python and JavaScript. Technology product alternatives for the middleware technology component may include, but are not limited to, Apache Tomcat server, JBoss server and Oracle server. Technology product alternatives for the cloud component may include, but are not limited to, Microsoft Azure, Amazon webservices and Google cloud platform. Technology product alternatives for the network component may include, but are not limited to, Local Area Network (LAN), Wireless (WLAN), Wide Area Network (WAN) and Virtual Private Network (VPN). Technology product alternatives for the virtualization technique component may include, but are not limited to, VMware, Microsoft Hyper-V, Openstack and Xen.

Based on the information obtained from the current application system 110, application manager 130 may build a plurality of alternative model application environments 136 that can potentially be used for the software application 112. For example, based on the information obtained from the current application system 110, application manager 130 may determine the technology components 122a-122n that need to be incorporated into an application environment meant for the software application 112. Once, the technology components 122a-122n are identified, application manager 130 may identify the plurality of alternative technology products 124 available for each of the technology components 122a-122n. The alternative technology products 124 identified for each technology component 122a-122n may include the current technology product 124a-124n being used in the current application environment 120 for the technology components 122a-122n. Application manager 130 may build a plurality of model application environments 136 for the software application 112 by selecting for each model application environment 136 a different combination of the technology products 124 for the technology components 122a-122n. That is, each model application environment 136 is built to use a combination of technology products 124 that is different from the combinations of technology products 124 used for other model application environments 136 built for the software application 112. In one embodiment, the model application environments 136 include a copy of the current application environment 120. Application manager 130 builds the copy of the current application environment 120 as part of building the model application environments 136 for comparing with other model application environments 136.

Application manager 130 may run the software application 112 using each of the model application environments (including the copy of the current application environment 120) in a simulated environment and collect the plurality of performance metrics 138 related to performance of the software application 112 in the current application environment 120 and each of the model application environments 136 while running in the simulated environment.

Application manager 130 may collect data relating to the plurality of performance metrics 138 related to performance of the software application in each of the model application environments 136 (including the current application environment 120) while running in the simulated environment. The plurality of performance metrics 138 may include, but are not limited to, one or more of application server performance, performance related to type of data handled by the software application, database performance, data security analysis, input and output analysis and deployment on cloud platforms. Application server performance may relate to response time of the application server at different levels of load (e.g., user traffic, amount of data etc.). Performance data related to the type of data handled by the software application 112 may include information relating to whether the software application 112 handles sensitive data needing a higher level of security and whether a model application environment 136 can handle sensitive data. This performance metric may allow the application manager 130 to recommend secure technology products 124 that can securely handle sensitive user data, such as private cloud product or a virtual machine where the virtualization is done at the hardware level to provide maximum security. Database performance may relate to database response times. Data relating to data security analysis may include security vulnerabilities (e.g., relating to data security) of the software application 112 in particular model application environments 136. Application manager 130 scans the software application 112 for known vulnerabilities in each model application environment 136 and for potential threats to the application 112. Application manager 130 may determine based on this performance metric whether a particular model application environment 136 is vulnerable to attacks. Data related to deployment on cloud platforms may include information relating to whether the software application 112 can be deployed on cloud platforms. For example, application manager 130 may analyze whether the software application 112 is suitable for deploying on a cloud platform based on running the software application 112 in model application environments 136 including cloud deployments. This performance metric may help the application manager 130 determine whether the software application 112 can be deployed on cloud platforms or is more suitable for a private in-house server or virtual machine deployment.

To measure the performance of the software application 112 in each model application environment 136, application manager 130 may run one or more tests on each model application environment 136 while the simulator logic is running the software application 112 in the model application environment 136. Application manager 130 may collect one or more of the performance metrics 138 described above corresponding to each model application environment 136 as a result of conducting the one or more tests. The tests may include load testing to test the software application 112 at different amounts of load (e.g., user traffic, amount of data etc.). For example, load testing may include simulating simultaneous logins of different numbers of users using different amounts of test data. Additionally or alternatively, the tests may include performance testing to test the overall performance of a model application environment 136 and collect data on performance metrics 142 including availability, response time and stability of the software application 112. In one example, for each model application environment 136, application manager 130 carries out the testing in multiple cycles with different amounts of load. For example, each model application environment 136 is tested initially with 10 k simultaneous user logins and 100 GB of test data.

This test cycle is then repeated three times with a replication load factor of 2×. This means with each test cycle, the load applied is two times that applied in the previous test cycle. In one embodiment, the load size may be customized based on the requirements of the software application 112. In an additional embodiment, application manager 130 tests each model application environment 136 for security vulnerabilities (e.g., data security) and collects data relating to how vulnerable the model application environment 136 is to potential security threats.

At step 504, application manager 130 assigns a performance score to each of the performance metrics collected for the current application environment and each of the model application environments.

Application manager 130 may analyze the performance metrics 138 collected for each model application environment 136 (including the current application environment 120) and generate the recommendation report 140 based on the analysis. The recommendation report 140 may include a recommendation to use one or more model application environments 136 for the software application 112 that are found to perform better than the current application environment 120 based on the analysis of the performance metrics 138. Additionally or alternatively, the recommendation report 140 may include recommendations to use individual technology products 124 for one or more technology components 122 that satisfy one or more performance requirements of the software application 112.

To analyze the performance metrics 138, for each model application environment 136 (including the current application environment 120), application manager 130 assigns a performance score to each performance metric 138 collected for the model application environment 136. Application manager 130 may assign a higher score for a higher level of performance related to a performance metric 138. For example, if a first model application environment 136 is found to be able to handle 500 simultaneous user logins at one time and a second model application environment 136 is found to be able to handle 10$k$ simultaneous user logins at one time, the application performance metric for the second model application environment 136 is assigned a higher performance score than the application performance metric for the first model application environment 136.

At step 506, application manager 130 compares the respective scores assigned to each performance metric 138 collected for the current application environment 120 and each of the model application environments 136.

At step 508, application manager 130 checks if all performance metrics 138 collected for all model application environments have been compared. If not, application manager 130 continues comparing the performance metrics at step 506. When all performance metrics 138 collected for all model application environments have been compared, method 500 proceeds to step 510.

At step 510, application manager 130 detects that at least one model application environment 136 has a higher score associated with at least one performance metric 138 as compared to the respective score of the at least one performance metric 138 collected for the current application environment 120.

At step 512, application manager recommends the model application environment 136 that is found to have a higher score with regard to the at least one performance metric 138 as compared to the respective score of the at least one performance metrics 138 collected for the current application environment 120. For example, application manager 130 may recommend a model application environment 136 for the software application 112 over the current application environment 120 based on a higher score associated with the application server performance metric collected for the model application environment 136.

In additional or alternative embodiments, application manager 130 may segregate the performance metrics 138 collected for each model application environment 136 including the current application environment 120. The segregating may include grouping together data collected for each performance metric 138 for all the model application environments 136. For example, data relating to application server performance metric collected for all model application environments 136 may be grouped together. Similarly, data relating to database performance metric collected for all model application environments 136 may be grouped together. Application manager 130 may compare the model application environments 136 based on each performance metric 138 collected for the respective model application environments 136, for example, based on performance scores of the performance metric 138 collected for the model application environments. For example, the application server performance metric of all model application environments 136 may be compared separately. Similarly, the database performance metric of all model application environments 136 may be compared separately. Application manager 130 may recommend one or more model application environments 136 and/or individual technology products 124 based on results of the comparison.

In one or more embodiments, application manager 130 may compare the total performance scores of multiple performance metrics 138 collected for each model application environment 136 and recommend a model application environment 136 that has the highest total performance score for the performance metrics 138. For example, application manager 130 may compare the total performance scores of all performance metrics 138 collected for each model application environment 136 and recommend a model application environment 136 that has the highest total performance score of for the performance metrics 138.

In one or more embodiments, application manager 130 may sort the performance metrics 138 collected for each model application environment 136 (including the current application environment 120) based on one or more requirements of the software application 112, for example, by placing a higher priority on performance metrics 138 that are associated with the one or more requirements of the software application 112. Application manager 130 may recommend one or more model application environments 136 and or individual technology products 124 that have higher scores recorded for the prioritized performance metrics 138 associated with the one or more requirements of the software application 112, regardless of scores recorded for other performance metrics 138. For example, the software application 112 may require high database performance (e.g., quick response times) and high data security as a result of handling sensitive user data. Accordingly, application manager 130 may prioritize the database performance metric and the security performance metric over other performance metrics 138 collected for the model application environments 136. In this case, application manager 130 recommends one or more model application environments 136 that were found to have the highest scores for the database performance metric and the security performance metric. Application manager 130 may obtain the one or more requirements of the software application 112 in response to receiving a request for the one or more requirements or by automatically determining the one or more requirements by analyzing one or more performance metrics 138 of the software application 112. For example, based on analyzing the software application 112 while running using one or more model application environments 136, application manager may determine that the software application is vulnerable to cyber attacks. This detection may prompt the application manager 130 to prioritize the data security metric for recommending model application environments 136 that were found to have the highest scores related to the data security metric.

In one embodiment, application manager 130 may compare one or more model application environments 136 with the current application environment 120 based on the performance scores of a prioritized performance metric 138 (e.g., database performance, application server performance etc.). If application manager 130 determines that a model application environment 136 has a higher score for the performance metric 138 as compared to the respective score of the performance metric 138 collected for the current application environment 120, application manager 130 may determine at least one technology product 124 used for a corresponding technology component 122 associated with the performance metric 138 in the determined model application environment 136 that is different from the current technology product 124 used for the technology component 122 in the current application environment 120. Application manager 130 recommend using the determined at least one technology product 124 for the technology component 122 to achieve a higher level of performance related to the prioritized performance metric 138.

In an additional or alternative embodiment, application manager 130 may receive a request for a higher level of performance related to a performance metric 138 associated with at least one technology component 122 as compared to a current level of performance related to the performance metric 138 in the current application environment 120. In response, application manager 130 may compare one or more model application environments 136 with the current application environment 120 based on the performance scores of the requested performance metric 138. Based on the results of the comparison, application manager 130 may determine a model application environment 136 that yielded a higher score for the requested performance metric 138 compared to the score of the performance metric 138 in the current application environment 120. Application manager 130 may determine a technology product 124 used for the at least one technology component 122 in the determined model application environment 136 and recommends using the determined technology product 124 for the at least one technology component 122 to achieve the requested higher level of performance related to the performance metric 138.

Figure 6:
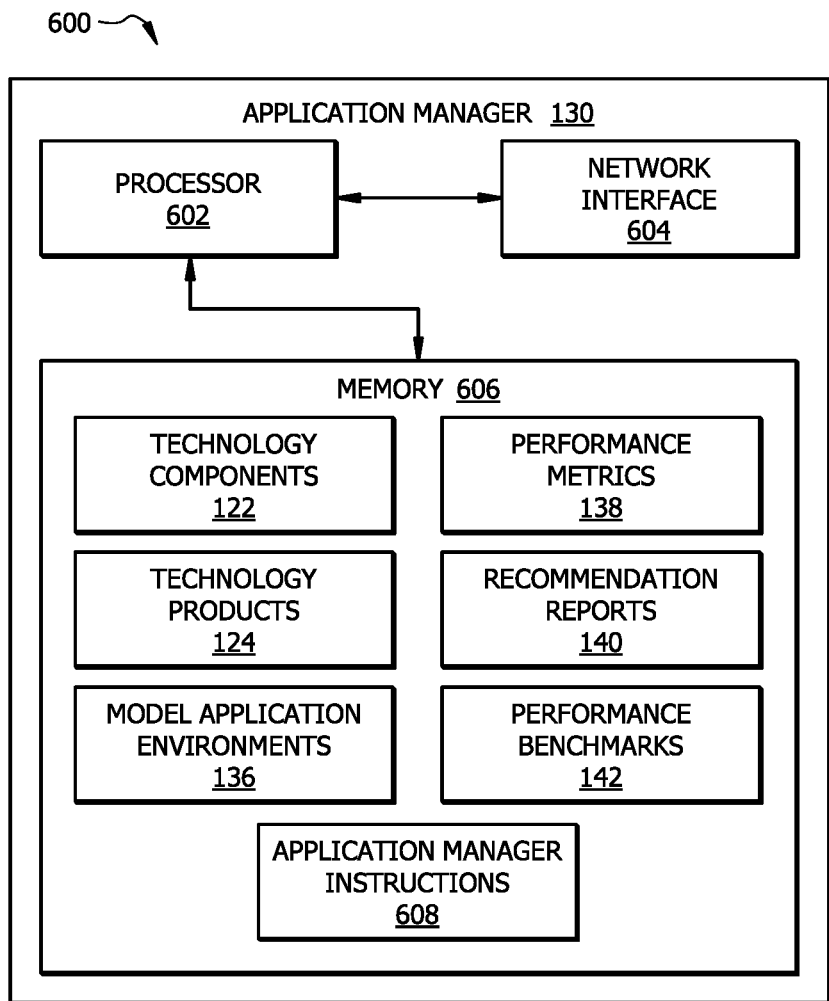
FIG. 6 illustrates an example schematic diagram of the application manager illustrated in FIG. 1, in accordance with one or more embodiments of the present disclosure.

FIG. 6 illustrates an example schematic diagram of the application manager 130 illustrated in FIG. 1, in accordance with one or more embodiments of the present disclosure.

Application manager 130 includes a processor 602, a memory 606, and a network interface 604. The application manager 130 may be configured as shown in FIG. 6 or in any other suitable configuration.

The processor 602 comprises one or more processors operably coupled to the memory 606. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 606. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., application manager instructions 608) to implement the application manager 130. In this way, processor 602 may be a special-purpose computer designed to implement the functions disclosed herein. In one or more embodiments, the application manager 130 is implemented using logic units, FPGAs, ASICs, DSPs, or any other suitable hardware. The application manager 130 is configured to operate as described with reference to FIGS. 1-5. For example, the application manager 130 may be configured to perform at least a portion of the methods 200, 300, 400 and 500 as described in FIGS. 2, 3, 4 and 5 respectively.

The memory 606 comprises one or more disks, tape drives, or solid-state drives, and may be used as an over-flow data storage device, to store programs when such programs are selected for execution, and to store instructions and data that are read during program execution. The memory 606 may be volatile or non-volatile and may comprise a read-only memory (ROM), random-access memory (RAM), ternary content-addressable memory (TCAM), dynamic random-access memory (DRAM), and static random-access memory (SRAM).

The memory 606 is operable to store information relating to technology components 122, technology products 124, model application environments 136, performance metrics 138, recommendation reports 140, performance benchmarks 142 and application manager instructions 608. The application manager instructions 608 may include any suitable set of instructions, logic, rules, or code operable to execute the application manager 130.

The network interface 604 is configured to enable wired and/or wireless communications. The network interface 604 is configured to communicate data between the application manager 130 and other devices, systems, or domains (e.g. current application system 110). For example, the network interface 604 may comprise a Wi-Fi interface, a LAN interface, a WAN interface, a modem, a switch, or a router. The processor 602 is configured to send and receive data using the network interface 604. The network interface 604 may be configured to use any suitable type of communication protocol as would be appreciated by one of ordinary skill in the art.

It may be noted that current application system 110 may be implemented similar to the application manager 130. For example, the current application system 110 may include a processor and a memory storing instructions to implement the respective functionality as described above when executed by the processor. The memory of current application system 110 may store the software application 112 and the current application environment 120.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   at least one processor configured to:
   obtain information relating to a current application environment being used to run a software application, wherein the current application environment comprises one or more technology components including one or more software technology components, wherein each of the technology components uses a technology product from a plurality of alternative technology products available for the technology component, wherein each technology component comprises a type of software application and each technology product available for the technology component comprises a particular software product of the type, wherein:
   the type of software application comprises an operating system, a database software, a middleware software, a virtualization software or a combination thereof;
   the software product available for a particular software application comprises a particular software available for the respective database software, the middleware software, or the virtualization software that can be used in the current application environment to run the software application; and
   the current application environment uses a first software product for a first type of software application;
   identify based on the obtained information the one or more technology components being used for the software application;
   identify the plurality of alternative technology products for each of the one or more technology components;
   build one or more model application environments for the software application, wherein each of the model application environments comprises a different combination of the technology products used for the technology components, wherein the building comprises:

building each of the one or more model application environments by selecting for at least one of the technology components a technology product from the plurality of alternative technology products such that the model application environment uses a different combination of the technology products that is different from combinations of the technology products selected for other model application environments;

obtain a requirement for higher performance, in relation to a particular performance metric, of the software application corresponding to the first type of software application used in the current application environment as compared to a current performance of the software application corresponding to the first type of software application in the current application environment;

access performance benchmarks associated with a plurality of software products of the first type of software application, wherein the performance benchmark relating to each software product of the first type of software application indicates a level of performance associated with the software product corresponding to the particular performance metric;

select, based at least in part upon the performance benchmarks, a second software product for the first type of software application that is associated with a higher level of performance in relation to the particular performance metric as compared to the first software product for the first type of software application being used in the current application environment;

build a custom model application environment using the selected second software product for the first type of software application;

run respective simulations of the software application using the current application environment and the custom model application environment;

determine, based on the simulations, that the custom model application environment is associated with higher performance in relation to the particular performance metric as compared to the current application environment;

run the software application using the custom application environment instead of the current application environment to achieve higher performance, in relation to the particular performance metric, of the software application corresponding to the first type of software application; and a memory coupled to the at least one processor and configured to store information relating to the plurality of alternative technology products available for each of the technology components and the performance benchmark relating to one or more of the alternative technology products of at least one technology component.

2. The system of claim 1, wherein the information relating to the current application environment comprises information relating to the one or more technology components of the current application environment and the current technology product used for each of the one or more technology components.

3. The system of claim 1, wherein:
the at least one performance metric relates to load performance or processing speed performance.

4. The system of claim 1, wherein the at least one processor is further configured to:

detect that a new technology product has been added to one of the technology components; and build at least one additional model application environment having the new technology product selected for the technology component.

5. The system of claim 1, wherein the at least one processor is further configured to:

run the software application using the current application environment and each of the model application environments in a simulated environment;

collect a plurality of performance metrics related to performance of the software application in the current application environment and each of the model application environments while running in the simulated environment;

assign a score to each of the performance metrics collected for the current application environment and each of the model application environments, wherein a higher score is assigned to a higher level of performance related to the performance metric;

compare the respective scores assigned to each performance metric collected for the current application environment and each of the model application environments;

detect that at least one model application environment has a higher score associated with at least one performance metric as compared to the respective score of the at least one performance metric collected for the current application environment; and determine a recommendation to use the at least one model application environment for the software application based on the detecting.

6. The system of claim 1, wherein the plurality of performance metrics comprises metrics relating to one or more of application server performance, type of data handled by the software application, database performance, security analysis, input and output analysis, deployment on cloud platforms.

7. A method for building an application environment for a software application, comprising:

obtaining information relating to a current application environment being used to run a software application, wherein the current application environment comprises one or more technology components including one or more software technology components, wherein each of the technology components uses a technology product from a plurality of alternative technology products available for the technology component, wherein each technology component comprises a type of software application and each technology product available for the technology component comprises a particular software product of the type, wherein:

the type of software application comprises an operating system, a database software, a middleware software, a virtualization software or a combination thereof;

the software product available for a particular software application comprises a particular software available for the respective database software, the middleware software, or the virtualization software that can be used in the current application environment to run the software application; and the current application environment uses a first software product for a first type of software application;

identifying based on the obtained information the one or more technology components being used for the software application;

identifying the plurality of alternative technology products for each of the one or more technology components;
building one or more model application environments for the software application, wherein each of the model application environments comprises a different combination of the technology products used for the technology components, wherein the building comprises:
building each of the one or more model application environments by selecting for at least one of the technology components a technology product from the plurality of alternative technology products such that the model application environment uses a different combination of the technology products that is different from combinations of the technology products selected for other model application environments;
obtaining a requirement for higher performance, in relation to a particular performance metric, of the software application corresponding to the first type of software application used in the current application environment as compared to a current performance of the software application corresponding to the first type of software application in the current application environment;
accessing performance benchmarks associated with a plurality of software products of the first type of software application, wherein the performance benchmark relating to each software product of the first type of software application indicates a level of performance associated with the software product corresponding to the particular performance metric;
selecting, based at least in part upon the performance benchmarks, a second software product for the first type of software application that is associated with a higher level of performance in relation to the particular performance metric as compared to the first software product for the first type of software application being used in the current application environment;
building a custom model application environment using the selected second software product for the first type of software application;
running respective simulations of the software application using the current application environment and the custom model application environment;
determining, based on the simulations, that the custom model application environment is associated with higher performance in relation to the particular performance metric as compared to the current application environment;
running the software application using the custom application environment instead of the current application environment to achieve higher, in relation to the particular performance metric, of the software application corresponding to the first type of software application.

8. The method of claim 7, wherein the information relating to the current application environment comprises information relating to the one or more technology components of the current application environment and the current technology product used for each of the one or more technology components.

9. The method of claim 7, wherein:
the at least one performance metric relates to load performance or processing speed performance.

10. The method of claim 7, further comprising:
detecting that a new technology product has been added to one of the technology components; and
building at least one additional model application environment having the new technology product selected for the technology component.

11. The method of claim 7, further comprising:
running the software application using the current application environment and each of the model application environments in a simulated environment;
collecting a plurality of performance metrics related to performance of the software application in the current application environment and each of the model application environments while running in the simulated environment;
assigning a score to each of the performance metrics collected for the current application environment and each of the model application environments, wherein a higher score is assigned to a higher level of performance related to the performance metric;
comparing the respective scores assigned to each performance metric collected for the current application environment and each of the model application environments;
detecting that at least one model application environment has a higher score associated with at least one performance metric as compared to the respective score of the at least one performance metric collected for the current application environment; and
determining a recommendation to use the at least one model application environment for the software application based on the detecting.

12. The method of claim 7, wherein the plurality of performance metrics comprises metrics relating to one or more of application server performance, type of data handled by the software application, database performance, security analysis, input and output analysis, deployment on cloud platforms.

13. A non-transitory computer-readable medium storing instructions which when executed by a processor cause the processor to:
obtain information relating to a current application environment being used to run a software application, wherein the current application environment comprises one or more technology components including one or more software technology components, wherein each of the technology components uses a technology product from a plurality of alternative technology products available for the technology component, wherein each technology component comprises a type of software application and each technology product available for the technology component comprises a particular software product of the type, wherein:
the type of software application comprises an operating system, a database software, a middleware software, a virtualization software or a combination thereof;
the software product available for a particular software application comprises a particular software available for the respective database software, the middleware software, or the virtualization software that can be used in the current application environment to run the software application;
the current application environment uses a first software product for a first type of software application;
identify based on the obtained information the one or more technology components being used for the software application;
identify the plurality of alternative technology products for each of the one or more technology components;

build one or more model application environments for the software application, wherein each of the model application environments comprises a different combination of the technology products used for the technology components, wherein the building comprises:
    building each of the one or more model application environments by selecting for at least one of the technology components a technology product from the plurality of alternative technology products such that the model application environment uses a different combination of the technology products that is different from combinations of the technology products selected for other model application environments;
obtain a requirement for higher performance, in relation to a particular performance metric, of the software application corresponding to the first type of software application used in the current application environment as compared to a current performance of the software application corresponding to the first type of software application in the current application environment;
access performance benchmarks associated with a plurality of software products of the first type of software application, wherein the performance benchmark relating to each software product of the first type of software application indicates a level of performance associated with the software product corresponding to the particular performance metric;
select, based at least in part upon the performance benchmarks, a second software product for the first type of software application that is associated with a higher level of performance in relation to the particular performance metric as compared to the first software product for the first type of software application being used in the current application environment;
build a custom model application environment using the selected second software product for the first type of software application;
run respective simulations of the software application using the current application environment and the custom model application environment;
determine, based on the simulations, that the custom model application environment is associated with higher performance in relation to the particular performance metric as compared to the current application environment;
run the software application using the custom application environment instead of the current application environment to achieve higher performance, in relation to the particular performance metric, of the software application corresponding to the first type of software application.

14. The non-transitory computer-readable medium of claim 13, wherein the information relating to the current application environment comprises information relating to the one or more technology components of the current application environment and the current technology product used for each of the one or more technology components.

15. The non-transitory computer-readable medium of claim 13, wherein the instructions further cause the processor to:
    detect that a new technology product has been added to one of the technology components; and
    build at least one additional model application environment having the new technology product selected for the technology component.

16. The non-transitory computer-readable medium of claim 13, wherein the instructions further cause the processor to:
    run the software application using the current application environment and each of the model application environments in a simulated environment;
    collect a plurality of performance metrics related to performance of the software application in the current application environment and each of the model application environments while running in the simulated environment;
    assign a score to each of the performance metrics collected for the current application environment and each of the model application environments, wherein a higher score is assigned to a higher level of performance related to the performance metric;
    compare the respective scores assigned to each performance metric collected for the current application environment and each of the model application environments;
    detect that at least one model application environment has a higher score associated with at least one performance metric as compared to the respective score of the at least one performance metric collected for the current application environment; and
    determine a recommendation to use the at least one model application environment for the software application based on the detecting.

17. The non-transitory computer-readable medium of claim 13, wherein the plurality of performance metrics comprises metrics relating to one or more of application server performance, type of data handled by the software application, database performance, security analysis, input and output analysis, deployment on cloud platforms.

* * * * *